US008797184B2

(12) United States Patent
Tate et al.

(10) Patent No.: US 8,797,184 B2
(45) Date of Patent: Aug. 5, 2014

(54) ADVANCED ACCESSIBLE PEDESTRIAN SYSTEM FOR SIGNALIZED TRAFFIC INTERSECTIONS

(75) Inventors: Philip Tate, Boise, ID (US); Richard Wall, Moscow, ID (US); Craig Cravioto, Moscow, ID (US); Cody Browne, Moscow, ID (US); Zane Sapp, Moscow, ID (US); Gabriel Deruwe, Moscow, ID (US)

(73) Assignees: University of Idaho, Moscow, ID (US); Campbell Company, Boise, ID (US)

( * ) Notice: Subject to any disclaimer, the term of this patent is extended or adjusted under 35 U.S.C. 154(b) by 197 days.

(21) Appl. No.: 13/059,635

(22) PCT Filed: Aug. 19, 2009

(86) PCT No.: PCT/US2009/054351

§ 371 (c)(1), (2), (4) Date: Feb. 17, 2011

(87) PCT Pub. No.: WO2010/022179

PCT Pub. Date: Feb. 25, 2010

(65) Prior Publication Data

US 2011/0148660 A1 Jun. 23, 2011

Related U.S. Application Data

(60) Provisional application No. 61/189,483, filed on Aug. 19, 2008.

(51) Int. Cl.
*G08G 1/07* (2006.01)

(52) U.S. Cl.
CPC . *G08G 1/07* (2013.01); *C08G 1/005* (2013.01)
USPC .......................................... 340/925; 340/906

(58) Field of Classification Search
USPC ................................................. 340/925, 906
See application file for complete search history.

(56) References Cited

U.S. PATENT DOCUMENTS

| | | | |
|---|---|---|---|
| 4,025,922 | A | 5/1977 | Trawick, III |
| 4,463,339 | A | 7/1984 | Frick et al. |
| 5,241,307 | A | 8/1993 | Bidault et al. |
| 5,309,155 | A | 5/1994 | Hsien et al. |
| 5,764,163 | A | 6/1998 | Waldman et al. |
| 5,822,711 | A | 10/1998 | Ochoa-Chavez |
| 5,917,432 | A | 6/1999 | Rathbone |

(Continued)

FOREIGN PATENT DOCUMENTS

| | | | |
|---|---|---|---|
| DE | 60301666 | T2 | 6/2006 |
| GB | 2425387 | A | 10/2006 |
| WO | WO 2007/008837 | | 1/2007 |

OTHER PUBLICATIONS

Harkey, et al., "Accessible Pedestrian Signals: A Guide to best Practices," Contractor's Guide for NCHRP Project 3-62, 428 pp., submitted Jun. 2007.

(Continued)

*Primary Examiner* — Thomas Mullen
(74) *Attorney, Agent, or Firm* — Klarquist Sparkman, LLP

(57) ABSTRACT

Pedestrian call systems with bidirectional communication between pedestrian call stations and traffic controllers are arranged so as to detect system errors. Communications can be provided over power conductors, and systems can be configured and monitored using a web browser. In one example, traffic systems are provided with Ethernet interfaces that can be used for bidirectional communication over power lines.

15 Claims, 21 Drawing Sheets

(56) References Cited

U.S. PATENT DOCUMENTS

| | | | |
|---|---|---|---|
| 6,072,407 | A | 6/2000 | Shin |
| 6,127,943 | A | 10/2000 | Tauchi et al. |
| 6,246,954 | B1 | 6/2001 | Berstis et al. |
| 6,281,808 | B1 | 8/2001 | Glier et al. |
| 6,317,058 | B1 | 11/2001 | Lemelson et al. |
| 6,567,010 | B1 | 5/2003 | Lin et al. |
| 6,617,981 | B2 | 9/2003 | Basinger |
| 6,633,238 | B2 | 10/2003 | Lemelson |
| 6,762,689 | B2 | 7/2004 | Dechape |
| 6,822,581 | B2 | 11/2004 | Chaffe |
| 6,950,789 | B2 | 9/2005 | Laird et al. |
| 7,145,476 | B2 | 12/2006 | Beckwith et al. |
| 2002/0097167 | A1 | 7/2002 | Bourgault |
| 2004/0054513 | A1 | 3/2004 | Laird et al. |
| 2005/0134478 | A1 | 6/2005 | Mese et al. |
| 2005/0187701 | A1 | 8/2005 | Baney |
| 2005/0270175 | A1 | 12/2005 | Peddie et al. |
| 2006/0028357 | A1 | 2/2006 | Beckwith |
| 2006/0037528 | A1 | 2/2006 | Farritor et al. |
| 2006/0038702 | A1 | 2/2006 | Lo |
| 2006/0129347 | A1 | 6/2006 | Gadh et al. |
| 2008/0218380 | A1 | 9/2008 | Wall et al. |

OTHER PUBLICATIONS

Manual on Uniform Traffic Control Devices for Streets and Highways, 2009 Edition, 864 pp., Dec. 2009.

Doyle et al., "A time-triggered transducer network based on an enhanced IEEE 1451 model," *Microprocessors and Microsystems*, 28, pp. 1-12, 2004.

Harkey et al., "Guidelines for Accessible Pedestrian Signals," Contractor's Final Report for NCHRP Project 3-62, 139 pp., submitted 2007.

Wall, "Advanced Accessible Pedestrian Signals," NIATT presentation for University of Idaho College of Engineering, http://www.ece.uidaho.edu/ee/digital/rwall/research/transportation/penn_state.pdf, 10 pp., Dec. 8, 2008.

Written Opinion and International Search Report for related International Application No. PCT/US2009/054351, 7 pp., dated Nov. 11, 2009.

Current AAPS System Status

816

System Time: ERR

| Pedestrian Signal | A | B | C | D | E | F | G | H |
|---|---|---|---|---|---|---|---|---|
| Status | ERR | ERR | ERR | ERR | ERR | ERR | ERR | ERR |
| Calls | ERR | ERR | ERR | ERR | ERR | ERR | ERR | ERR |

Legend:

| | |
|---|---|
| W | Walk |
| DW | Don't Walk |
| FWD | Flashing Don't Walk |
| NC | No Voltage |

Ped Signal D
Ped Signal F
#'s are Ped Stations

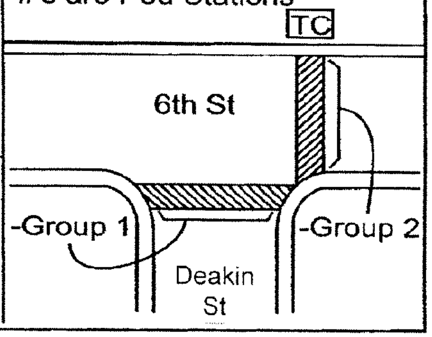

System Status | System Configuration | Time Configuration | Station Settings | File Upload | View Log Files Station Status

| Station | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Audion Msg. # | 0 | 0 | 0 | 0 | 0 | 0 | 0 | 0 | 0 | 0 | 0 | 0 | 0 | 0 | 0 | 0 |
| Ped Calls | 0 | 0 | 0 | 0 | 0 | 0 | 0 | 0 | 0 | 0 | 0 | 0 | 0 | 0 | 0 | 0 |
| APS Calls | 0 | 0 | 0 | 0 | 0 | 0 | 0 | 0 | 0 | 0 | 0 | 0 | 0 | 0 | 0 | 0 |

Audio Message Legend:

| | |
|---|---|
| #1 | Locator Tone |
| #2 | Initiation Beacon Tone |
| #3 | Destination Beacon Tone |
| #4 | Wait Message |
| #5 | Walk Message |
| #6 | Location Message |
| #7 | Custom Message |
| #8 | Emergency Pre-emption |

FIG. 19F

ADVANCED ACCESSIBLE PEDESTRIAN SYSTEM FOR SIGNALIZED TRAFFIC INTERSECTIONS

CROSS REFERENCE TO RELATED APPLICATIONS

This is the U.S. National Stage of International Application No. PCT/US2009/054351, filed Aug. 19, 2009, which was published in English under PCT Article 21(2), which in turn claims the benefit of U.S. Provisional Application No. 61/189,483, filed Aug. 19, 2008. The provisional application is incorporated herein in its entirety.

CROSS REFERENCE TO RELATED APPLICATION

This application claims the benefit of the earlier filing date of U.S. Provisional Application No. 61/189,483, filed on Aug. 19, 2008. The entire disclosure of provisional application No. 61/189,483 is considered to be part of the disclosure of the accompanying application and is incorporated herein by reference.

ACKNOWLEDGMENT OF GOVERNMENT SUPPORT

This invention was made with Government support under DTRT07G0056 awarded by the U.S. Department of Transportation. The Government has certain rights in the invention.

FIELD

The disclosure pertains to traffic control systems, particularly for visually impaired pedestrians.

BACKGROUND

Traffic control systems are ubiquitous in modern transportation systems. Traffic control systems are commonly used to regulate the flow of motorized vehicles, non-motorized vehicles and pedestrians on roads, streets, highways, bridges, and other surface transportation media designated for such purposes. Henceforth, the term “roadway” will be used to include any surface transportation media. Traffic control systems use visible indicators to direct when travel is permitted or not permitted on designated roadways. The purpose of traffic control systems is to provide safe and efficient access to the shared roadway for a specified group of roadway users. Crosswalks are portions of the roadway that are allocated for pedestrians to cross one or more roadways. They are identified by painted markings on the roadways and/or signage on the side of the roadway as described in the Manual for Uniform Traffic Controller Devices (MUTCD) which is available at http://mutcd.fhwa.dot.gov/htm/2003r1r2/html_index.htm.

A traffic control system is comprised of an electronic device that determines which vehicle and pedestrian signals are to be active to control movements through a designated portion of the roadway. As used herein, an intersection refers to the intersection of two or more roadways that share a common right of way in such a manner that one or more traffic movements must be constrained to avoid conflicts that may result in collisions. A signalized intersection is an intersection that uses a traffic control system to control vehicle and pedestrian movements at an intersection or on a roadway. The traffic control system may incorporate sensors that detect the presence of vehicles at specific places in the roadway. The traffic control system may also have detectors to sense when pedestrians press a button that signifies that they are requesting (calling for) service to be able to cross a specific element of the roadway.

Conventional traffic control systems used today consist of three essential elements: 1) the traffic controller that is responsible for determining which signals are on at any given time and, in some cases, processes sensor inputs, 2) one or more load switches that converts the traffic controller logic outputs to turn on and off 120 VAC, and 3) a conflict monitor (CM) or malfunction management unit (MMU) that monitors the outputs from the load switches to ensure safe operation by detecting signals that create a conflicts in traffic movements involving vehicles and, in some cases, pedestrians. The CM or MMU places the system into a safe fail mode if a conflict is detected.

Many traffic control systems provide control of pedestrian movements using visible and audible messages and/or symbols. According to the MUTCD, visible signals used to control pedestrian movements include illuminated signals that display the words “WALK”, “DON’T WALK”, and “WAIT.” Other traffic control systems use the illuminated symbol of a walking person in lieu of a “WALK” signal and a symbol of a hand in lieu of the “DON’T WALK” or “WAIT” signals. Some traffic control systems also include countdown timers that display the number of seconds remaining before the pedestrian is to be clear of the segment of the roadway shared with other users. In addition to the visible displays, some traffic control systems also broadcast audible messages in the form of verbal phrases or easily differentiable tones such as chirps and cuckoos that mimic bird calls.

Pedestrian movements at signalized intersections are controlled by displaying the “WALK” indication indicating that individuals should proceed to cross the designated roadway with due caution. The “WALK” display changes to a flashing “DON’T WALK” indicating that a pedestrian who is not already in the roadway should no longer leave the curb and enter the roadway. A non-flashing “DON’T WALK” display indicates to the pedestrian it is no longer safe to be in the roadway for the designated crossing.

Some pedestrian movements are controlled by the traffic controller that automatically allocates a regular fixed time interval for pedestrian crossings and requires no action by the pedestrian to register a request for service with the traffic controller. Some traffic control systems provide a sequence of displays to both vehicles and pedestrians when triggered by manual push buttons, or other pedestrian friendly features.

A pedestrian call system provides the means for pedestrian to request the traffic controller to provide a WALK indication during the appropriate interval associated with parallel traffic movement or provide an exclusive pedestrian movement. In the case of pedestrian movements combined with parallel vehicle movements, the timing of the vehicle movement may be extended to allow sufficient time for pedestrians to complete the crossing.

Usually the push buttons that are used by the pedestrian to register a request for service with the traffic controller are physically positioned in the proximity of the side of the roadway adjacent to the media used by motorized vehicles. The MUTCD gives guidelines as to the placement and orientation of the pedestrian activation buttons. However, variations of roadway geometries preclude consistent and predictable placement of the pedestrian call buttons at many signalized intersections.

The operation of today’s traffic control systems provide a reasonable degree of safety provided that pedestrians and vehicle operators use their sight to identify potential hazards and conflicts as well as to correctly identify the signal lights that are illuminated to control their movements. Pedestrians with cognitive and visual acuity impairments must rely on auditory cues to assist them in lieu of visual signals. The difficulties of crossing a roadway for people with cognitive and vision impairments are described in detail in Harkey et al., "Accessible Pedestrian Signals: A Guide to Best Practices" (hereinafter "Harkey") available at http://onlinepubs.trb.org/onlinepubs/nchrp/nchrp_w117a.pdf. Harkey's Appendix D (also available at http://www.walkinginfo.org/aps/appendix_d_understanding.cfm) discusses the safety and access difficulties faced by blind pedestrians. Both of these are incorporated herein by reference.

Unfortunately, although the proper operation of traffic signals is essential for safe passage of the visually impaired, pressing a call button merely activates a sequence of intended operations, but no confirmation of appropriate operation is available to the caller. Hence, visually impaired pedestrians rely on proper operation of traffic signaling systems, and cannot readily detect malfunctions. Accordingly, improved traffic control devices and methods are needed that permit visually impaired pedestrians to verify proper operation.

SUMMARY

The advanced accessible pedestrian call system (AAPS) comprises one or more pedestrian call stations (PCSs) located at intersection crosswalks, one pedestrian management units (PMUs) that registers call to the traffic controller and senses the status of the traffic signal lights and the communications infrastructure that allows exchange of information and controls between the PMU and one or more PCSs. While a PCS can be associated with a fixed call button, as used herein, a PCS is any device, fixed or mobile, that is used to register a pedestrian call with a traffic controller.

A pedestrian call station comprises a pedestrian call switch (push button) operable in response to a request by a pedestrian and a pedestrian station processor coupled to the pedestrian call switch and configured to communicate a traffic control request to a pedestrian management unit in response to activation of the pedestrian call switch and to receive an acknowledgment of the traffic control request from the pedestrian management processor. In some examples, a network interface is provided and is in communication with the pedestrian station processor, wherein the network interface is coupled to receive the acknowledgment of the pedestrian management processor request and communicate the pedestrian management processor request to the processor. In further examples, the pedestrian station processor is configured to retrieve at least one audio message from a memory at the pedestrian call station and to communicate an identifier associated with the retrieved audio message to a pedestrian management unit. In further examples, the processor is configured to communicate an identifier associated with an audio message volume to the traffic controller. In additional examples, the processor is configured to store an audio message received in the memory and to adjust an audio message volume based on a time of day and or the level of ambient noise. In some examples, a memory is coupled to the pedestrian station processor and operable to store audio messages and tones associated WALK, WAIT, DON'T WALK, beacon destination, and beacon initiation.

A pedestrian management unit (PMU) comprises a pedestrian management processor, an interface with the traffic controller cabinet, and a network interface coupled to the processor. The network interface is operable to receive a traffic control request from one or more pedestrian call stations and or another traffic control device and to transmit a traffic control request acknowledgment to the pedestrian call station or other traffic control device. Devices such as cell phones and other personal electronics can also be used. In some examples, the logic and processing required by the pedestrian management unit maybe a separated device located outside the traffic controller. In other cases, the logic and processing may be incorporated into the hardware and software of the traffic controller device. In some examples, the pedestrian management processor is operable to determine a traffic signal light status. In additional examples, the network interface is operable to communicate traffic signal light status. In some examples, the network interface is operable to direct at least one audio message to at least one pedestrian station processor. In other examples, a plurality of pedestrian call stations (PCSs) is provided, and at least one of the pedestrian call stations includes a network interface operable to transmit a pedestrian signal identifier to the pedestrian management processor. In further representative examples, the network interface is operable to receive an audio message and the pedestrian call station includes a memory configured to store the audio message. In other embodiments, the network interface is operable to transmit an audio message identifier to the pedestrian management processor. In additional examples, the pedestrian management processor is operable to send a communication to a second PCS in response to the traffic control request, the communication including an instruction to play a beacon message.

Representative PCSs include pedestrian button systems that comprise a pedestrian call switch operable in response to a request by a pedestrian and a processor coupled to the pedestrian call switch and configured to communicate a traffic control request to a traffic controller in response to activation of the pedestrian call switch and to receive an acknowledgment of the traffic control request from the traffic controller. In some examples, a network interface is provided and is in communication with the processor, wherein the network interface is coupled to receive the acknowledgment of the traffic control request and communicate the traffic control request to the processor. In further examples, the processor is configured to retrieve at least one audio message from a memory at the pedestrian button system and to communicate an identifier associated with the retrieved audio message to a traffic controller. In further examples, the processor is configured to communicate an identifier associated with an audio message volume to the traffic controller. In additional examples, the processor is configured to store an audio message received in the memory and to adjust an audio message volume based on a time of day. In some examples, a memory is coupled to the processor and operable to store audio messages associated WALK, WAIT, DON'T WALK, beacon destination, and beacon initiation.

Traffic control systems comprise a pedestrian management processor and a network interface coupled to the processor. The network interface is operable to receive a traffic control request from a traffic control device and to transmit a traffic control request acknowledgment to the traffic control device. In some examples, the pedestrian management processor is operable to determine a traffic control status. In additional examples, the network interface is operable to communicate traffic control system parameters. In some examples, the network interface is operable to direct at least one audio message to at least one traffic signal. In other examples, a plurality of accessible pedestrian signals is provided, and at least one of the accessible pedestrian signals includes a network interface operable to transmit a pedestrian signal identifier to the pedestrian management processor. In further representative examples, the network interface is operable to receive an audio message and the accessible pedestrian signal includes a memory configured to store the audio message. In other embodiments, the network interface is operable to transmit an audio message identifier to the pedestrian management processor. In additional examples, the pedestrian management processor is operable to send a communication to a second traffic control device in response to the traffic control request, the communication including an instruction to play a beacon message.

Traffic control methods comprise generating a call for service from a traffic control device, typically a PCS in response to a pedestrian request and communicating the call for service to a traffic controller. The status of the traffic signal lights is to be received at the pedestrian call station and an audio message associated with the requested service at the traffic control device is played. A verification that the audio message is being played is transmitted to the traffic controller. In further examples, a first beacon message is provided to the pedestrian call station and is played at the pedestrian call station after the requested service during the time associated with the WALK signal. A verification that the beacon message is being played is transmitted to the pedestrian management unit. In other examples, a destination associated with the requested service is determined, and a second beacon message is provided to a second PCS that is associated with the destination and stored in a memory at the destination PCS. The second beacon message is played PCS associated with the destination after the requested service and only during the time that that is associated with the assigned pedestrian movement. In other examples, a time of day is determined, and a volume for the audio message is established based on the time of day. In other examples, a time of day is determined, and a volume for the audio message is established based on the ambient audible noise.

The data transmitted over the network between the PCSs and the PMU can use any proprietary or open communications protocol. In one example, the AAPS employs a protocol standard that is compliant with the National Transportation Communications for Intelligent Transportation Systems Protocol (http://www.ntcip.org/).

Traffic control methods comprise generating a call for service from a traffic control device, typically a PCS in response to a pedestrian request and communicating the call for service to a traffic controller. The status of the traffic signal lights is to be received at the pedestrian call station, and an audio message associated with the requested service at the traffic control device is played. A verification that the audio message is being played is transmitted to the traffic controller. In further examples, a first beacon message is provided to the traffic control device and is played at the traffic control device after the requested service is authorized. A verification that the beacon message has been played is transmitted to the traffic controller. In other examples, a destination associated with the requested service is determined, and a second beacon message is provided to a traffic control device associated with the destination and stored in a memory at the destination traffic control device. The second beacon message is played at traffic control device associated with the destination after the requested service is authorized. In other examples, a time of day is determined, and a volume for the audio message is established based on the time of day.

The foregoing and other objects, features, and advantages of the invention will become more apparent from the following detailed description, which proceeds with reference to the accompanying figures.

BRIEF DESCRIPTION OF THE DRAWINGS

FIGS. 19A-19F are screen displays associated with browser-based maintenance and installation software for an AAPS.

DETAILED DESCRIPTION

Figure 1:
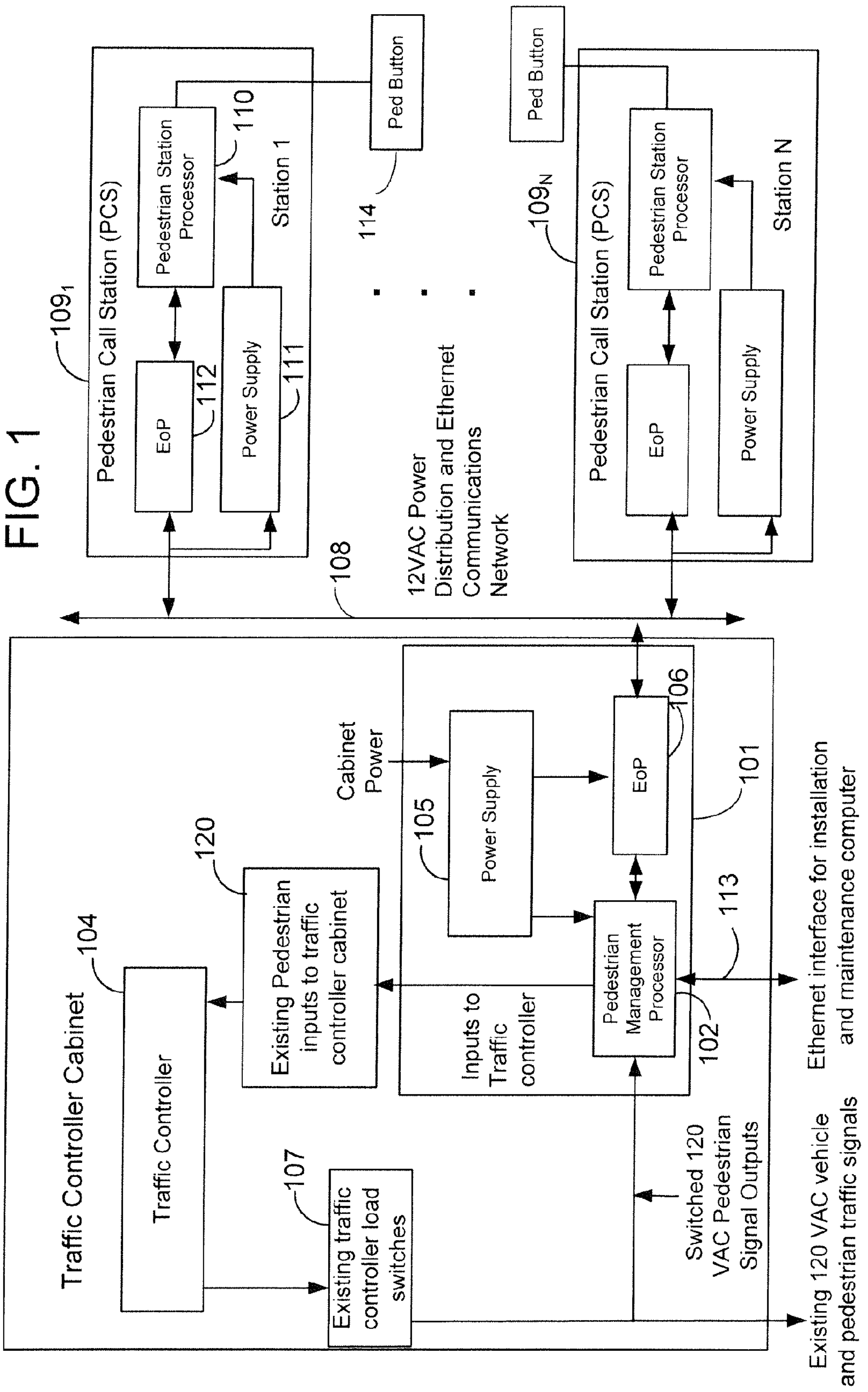
FIG. 1 is a schematic block diagram of a representative Advanced Accessible Pedestrian System (AAPS).

As used in this application and in the claims, the singular forms “a,” “an,” and “the” include the plural forms unless the context clearly dictates otherwise. Additionally, the term “includes” means “comprises.” Further, the term “coupled” means electrically or electromagnetically coupled or linked and does not exclude the presence of intermediate elements between the coupled items. Such coupling can be based on physical connections such as wired connections, or wireless connections based on, for example, optical, infrared, or radiofrequency communications.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Specific communication protocols, traffic signal configurations, and other details are described in the following examples for convenient illustration. In other examples, different communication protocols, traffic signal configurations, electronic components and groupings can be used. In the disclosed examples, reference is made to software objects which can include constant and variable data values, functions, and procedures that are implemented in series of computer-executable instructions that can be stored in memory, on hard drives, flash drives, or other computer readable media. Computer systems such as personal computers (desktops and laptops), networked computers and dumb terminals, palm tops, smart phones, or other computing devices can be used to execute such instructions. Alternatively, dedicated processors can be used. System components that are illustrated as separate can be combined, and single components that provide multiple functions can be implemented with two or more components.

In many examples, reference is made to messages or communications that are transmitted between system components. Such messages are typically delivered as modulated voltages or currents, or optical beams. Typically such messages or communications are encoded digitally, but analog or other formats can also be used.

Terminology

For convenience, descriptions of some terms used in the disclosure are provided herein.

MUTCD—Manual for Uniform Traffic Controller Devices

A traffic intersection—a location where vehicular traffic going in different directions can proceed in a controlled manner designed to minimize accidents Signalized intersection—A traffic intersection consisting of two or more streets where the vehicular and non vehicular traffic is managed using an automated electronic controller.

Traffic controller—a computer based device that uses a program to process inputs generated by electronic timers, in situ instrumentation or manually operated electric switches to generate outputs that control the state of visual and audible signals to control movements of vehicles, people, bicycles, and other human operated devices that move through the intersection under control.

Traffic controller cabinet—an equipment cabinet used to contain the traffic controller and other electrical and mechanical devices required to interface the traffic controller with input and output circuits and devices. The traffic controller cabinet is generally physically located in close proximity to the corners of the intersection.

Malfunction Management Unit (MMU)—an independent electronic device used with NEMA TS2 traffic controllers that monitors all traffic signal outputs from traffic controller cabinet to detect a malfunction or a conflict in operations.

Conflict Monitor (CM)—an independent electronic device used with NEMA TS1 traffic controllers that monitor all traffic signal outputs from traffic controller cabinet to detect a malfunction or a conflict in operations.

Accessible Pedestrian Signal (APS)—a device that communicates information about pedestrian timing in non-visual format such as audible tones, verbal messages, and/or vibrating surfaces as defined by the MUTCD.

Advanced Accessible Pedestrian Signal (AAPS)—advanced accessible pedestrian signal is a generic name of systems such as those described herein.

Pedestrian call—A pedestrian call or request for service is normally placed on current traffic controller installations when button is pressed that is located at one of the corners of the intersection. The pedestrian button completes a circuit that places a low impedance electrical path on the assigned pedestrian input in the traffic controller cabinet.

Initiation point—the physical place associated with a signalized intersection where the pedestrian places a call for service.

Destination point—the physical place associated with a signalized intersection where the pedestrian intends to travel.

Phase—a specific movement of vehicles or pedestrians through a signalized intersection.

Walk phase—the interval during which a WALK signal is illuminated for a particular pedestrian crossing.

Pedestrian clearance phase—the interval during which a WAIT signal Is flashing for a particular pedestrian crossing.

Beaconing (also known as target beaconing)—a term used to describe the concept of generating audible navigational cues to help visually impaired pedestrians. This is accomplished by generating a distinguishable audible signal at both the initiation and destination points.

Protocol stack—a set of network protocol layers that work together. The OSI Reference Model that defines seven protocol layers is often called a stack, as is the set of TCP/IP protocols that define communication over the internet. The term stack also refers to the actual software that processes the protocols.

SNMP manager—a system, software part of a systems used to control and monitor the activities of network hosts using SNMP.

Agents—Agents are software modules that reside in network elements. They collect and store management information such as the number of error packets received by a network element.

Managed object—a characteristic of something that can be managed. For example, a list of currently active TCP connections in a particular host computer is a managed object. Managed objects differ from variables, which are particular object instances.

A managed device—a network node that contains an SNMP agent and that resides on a managed network. Managed devices collect and store management information and make this information available to NMSs using SNMP. Managed devices, sometimes called network elements, can be any type of device including, but not limited to, routers, access servers, switches, bridges, hubs, IP telephones, computer hosts, and printers.

A network management system (NMS)—a collection computer-based network connected devices that executes application software that monitor and control managed devices. NMSs provide the bulk of the processing and memory resources required for network management. One or more NMSs may exist on any managed network.

Management information base (MIB)—a collection of managed objects residing in a virtual information store. Collections of related managed objects are defined in specific MIB modules.

GET REQUEST—used to retrieve a piece of management information.

GETNEXT REQUEST—used iteratively to retrieve sequences of management information.

GET RESPONSE—used by the agent to respond with data to get and set requests from the manager.

SET REQUEST—used to initialize and make a change to a value of the network element.

TRAP—used to report an alert or other asynchronous event about a managed subsystem. In SNMPv1, asynchronous event reports are called traps while they are called notifications in later versions of SNMP. In SMIv1 MIB modules, traps are defined using the TRAP-TYPE macro; in SMIv2 MIB modules, traps are defined using the NOTIFICATION-TYPE macro.

Representative Hardware Implementations

With reference to FIG. 1, a representative Advanced Accessible Pedestrian System (AAPS) includes Traffic Control Cabinet (TCC) 100 coupled to Pedestrian Call Stations (PCSs) $\mathbf{109}_1$-$\mathbf{109}_N$ that are in communication with the TCC 100 via a power bus 108 that is configured to support Ethernet-over-Powerline (EoP) as well as to provide 12 V AC power or other required electrical power to the PCSs 109. The TCC 100 includes a Traffic Controller 104, typically equipped with traffic controllers that conform to NEMA TS1 or TS2 protocols, or other suitable protocols, a Pedestrian Management Unit (PMU) 101 comprising a Pedestrian Management Processor (PMP) 102, an AAPS power supply 105, and an Ethernet-over-Powerline (EoP) interface 106. The EoP Interface 106 generally includes a coupler and a transceiver so that Ethernet electrical signals can be combined with electrical power such as 60 Hz, 120 VAC or other electrical power on two or more wires that can also serve as power cables. Typically, the PMU 101 and the traffic controller 104 are connected via one or more direct wired connections. The traffic controller 104 is typically coupled to one or more load switches 107 that are configured to operate associated vehicle and pedestrian control signals. The PMP 102 is coupled to the one or more load switches 107 so as to receive indications of pedestrian signal output status for one or more pedestrian signals. In some examples, load switch status is buffered by one or more buffer amplifiers or otherwise processed so as to control signal amplitude, digitize, or otherwise filter or process for delivery to the PMP 102. An Ethernet interface is configured for coupling to an external computer such as a laptop, desktop, or other portable, fixed, or networked computer that can be used to monitor system status and performance, to install or uninstall hardware and software, adjust various system settings, and configure additional pedestrian call stations. Thus, maintenance and installation can be accomplished with readily available computer hardware and software. In one example, the Ethernet interface can be configured to communicate with the external computer using a web browser and one or more web pages as will be illustrated below.

The PCSs 109 generally include EoP interfaces 112, power supplies 111, and a pedestrian call processor 110. The pedestrian call processors 110 are coupled to corresponding pedestrian buttons 114. Upon activation of a pedestrian button 114, the associated pedestrian call processor initiates a communication to the PMU 101 using EoP. In turn, the PMU 101 initiates a request for service to the traffic controller 104, typically using the PMP 102 to establish a low impedance path on at least one traffic controller input 120. In a typical installed system, two PCSs are provided on opposite sides of a crosswalk. PCSs can be configured to include traffic signals or traffic signals can be provided separately.

Figure 2:
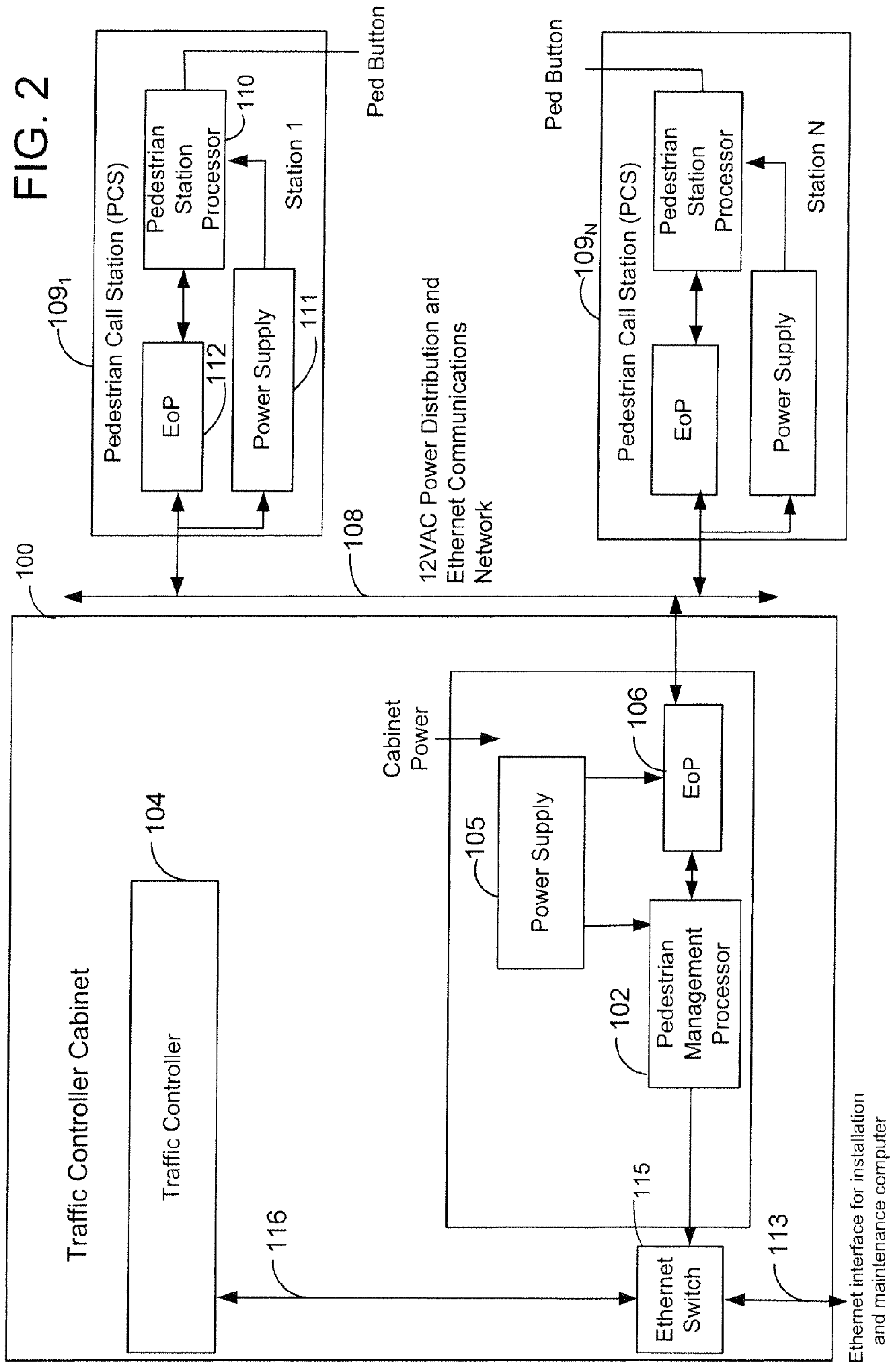
FIG. 2 is a schematic block diagram of another representative Advanced Accessible Pedestrian System (AAPS).

Referring to FIG. 2, in an alternative system to that of FIG. 1, the Ethernet interface 113 is coupled so that the PMU 101 can communicate via an Ethernet connection 116 with the traffic controller 104. Such a system can be convenient for traffic controllers that include Ethernet connections such as NEMA Type 2 Traffic Controllers that are compliant with National Transportation System for Communications ITS Protocol (NTCIP) standards. The Ethernet interface 113 can include an Ethernet switch or hub 115 to facilitate a connection 113 via a web browser to an external computer for maintenance and installation. Typically, the PMU 101 is configured to detect an Ethernet connection to the traffic controller 104. If such a connection is detected, direct wired connections to and from the traffic controller such as shown in FIG. 1 need not be used. Depending on system configuration, these connections can be set so as to have high impedance.

Figure 3:
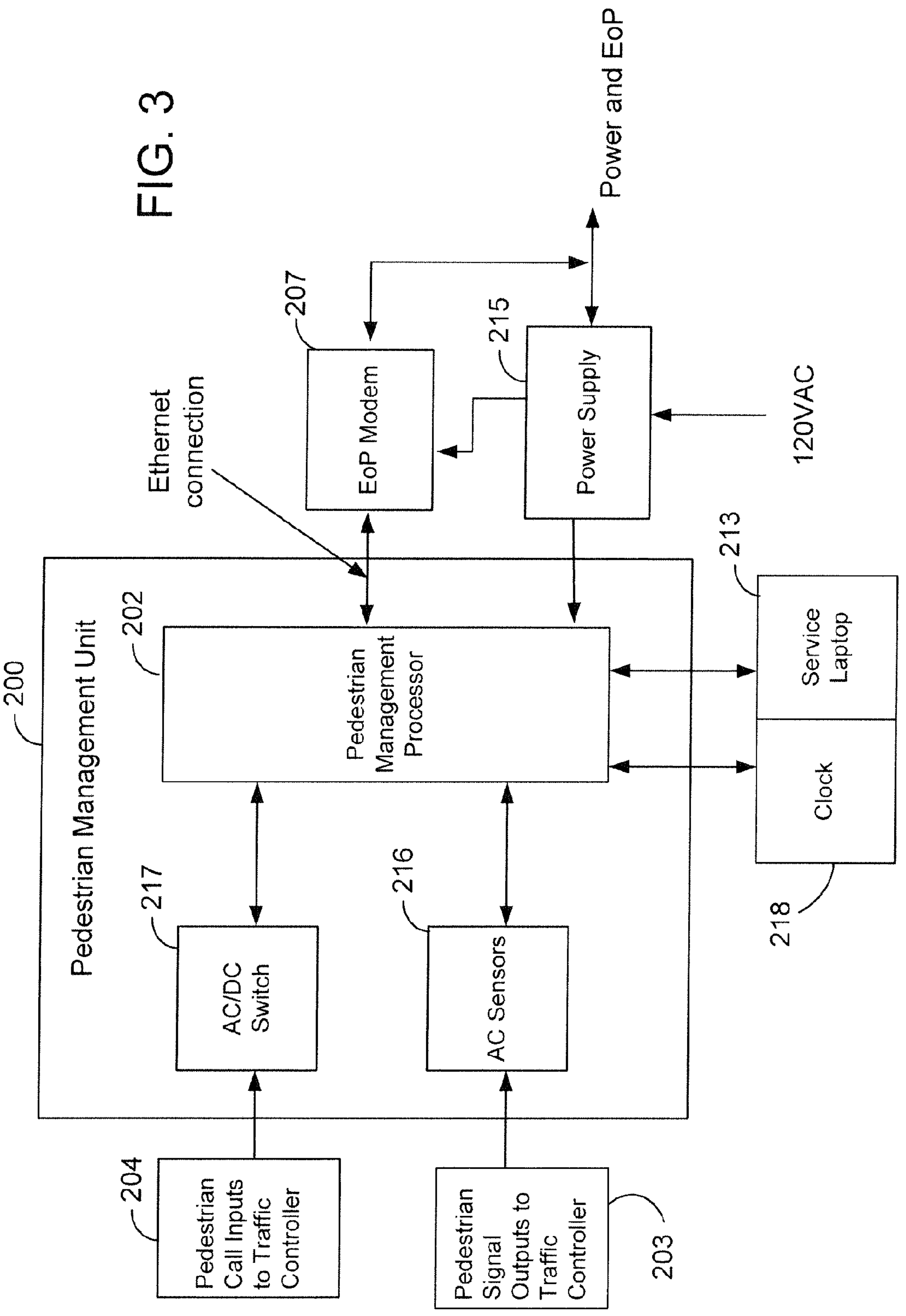
FIG. 3 is a schematic block diagram of a representative Pedestrian Management Unit (PMU).

A representative PMU 200 is illustrated in more detail in FIG. 3. The PMU 200 includes a pedestrian management processor 202 that is coupled to one or more AC/DC switches 217 and one or more AC sensors 216 using, for example, serial communications based on the $I^2C$ protocol or other suitable processor input/output mechanism. The AC/DC switches 217 are configured to be coupled to one or more pedestrian call inputs 204 and the AC sensors 216 are configured to be coupled to one or more pedestrian signal outputs 203. The processor 202 can also be coupled to an EoP Interface 207, a power supply 215, and a clock 218 such as a battery operated clock or a WWVB receiver so that current time is available. The availability of current time can be convenient for signal operation that varies as a function of time of day. In addition, the processor 202 is configured for coupling to an external computer such as a service lap top 213 via a web browser interface. These connections can be based on a convenient communication protocol such as provided by Ethernet, RS 232, USB, or others.

Figure 4:
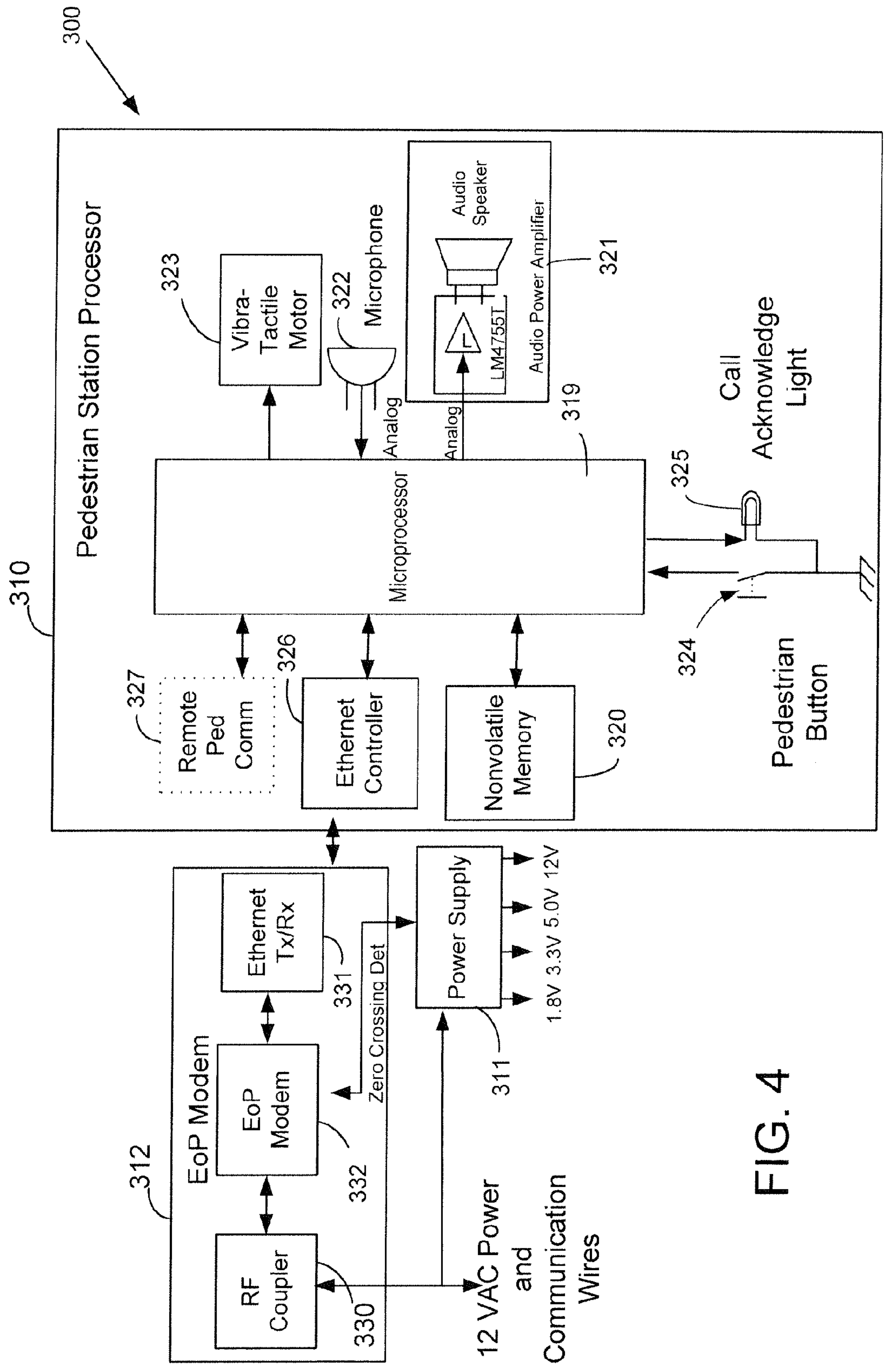
FIG. 4 is a schematic block diagram of a representative Pedestrian Call Station (PCS).

With reference to FIG. 4, a representative PCS 300 includes a pedestrian call processor (PCP) 310, an EoP Interface 312, and a power supply 311. The PCP 310 includes a microprocessor 319 that is coupled to a vibro-tactile motor 323, a microphone 322, and an audio output 321 that includes an audio amplifier and a speaker. In one example, the microprocessor 319 is a Cypress CYC829466 8-bit mixed signal processor, but other processors can be used. A pedestrian button 324 and an associated call acknowledgment light 325 are also coupled to the processor 319. An Ethernet controller 326 is coupled to the processor 319 and to the EoP Interface 312. The EoP Interface 312 includes an Ethernet transceiver 331, an EoP modem 332, and an RF coupler 330 that are configured to couple Ethernet electrical signals to and from one or more powerlines and the PAP 310. In one example, the Ethernet controller 326 is an ENC28J60 chip produced by Microchip Corporation, the Ethernet transceiver is a DP83848C chip produced by National Semiconductor, and the EoP Modem 332 is an UBT55MX module available from Intellon Corporation, but other circuits and combinations can be used. The processor 319 is also configured to communicate with a remote pedestrian button communication interface 327 that can communicate with a remote or mobile pedestrian button. Nonvolatile memory such as EEPROM can be provided as one or more memory chips 320, or memory can be provided in the processor 319. Typically a unique PCS identifier is stored in the memory, and the PCS identifier can be transmitted to a traffic controller or a pedestrian management system (PMS) so that the source of a particular pedestrian call can be identified.

Representative Software Implementations

Figure 5:
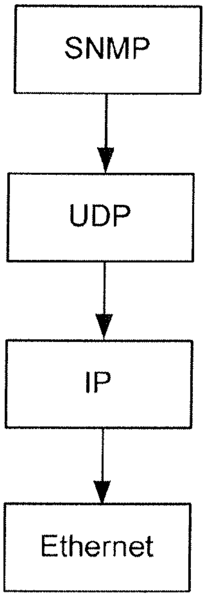
FIG. 5 is a schematic block diagram of a representative protocol stack.

AAPS hardware permits a variety of traffic control functions to be implemented using networked communications among various functional units. Generally, all PCSs and PMUs can function based on a Simple Network Management Protocol (SNMP) in which the PMU is an SNMP manager that is configured to make control decisions. PCSs are SNMP agents that are controlled by one or more managers. A representative SNMP software stack is illustrated in FIG. 5. Messages between managers and agents can be exchanged and parameters set, modified, and retrieved in an Ethernet network. If available, such messaging and the like can be implemented based on an existing set of commands and parameters, or a dedicated new set of messages and commands can be implemented. Some details of software used in AAPS implementations are described below, but the technology is not limited to a particular implementation.

Object Identifiers

Object Identifiers that can used in operation of an AAPS are described in the following tables. Phase Status Node objects (Table 1) are sent from the PMU to each pedestrian station (PCS) at regular intervals. Station Status Node objects (Table 2) are sent from the PCS to the PMU as their values change. The Station Trap objects (Table 3) contain objects sent from the PCS to the PMU as they occur, but additional information can be added. The PCS modifies the value of either Phase Status Calls or APS Calls OID depending on the type of input detected from the user of the button to the trap message. Each PCS can use its preconfigured Station Phase OID value in the value field of this OID. Configuration OID variables (Table 4) are configured once, unlike Status objects, and therefore these objects are saved to nonvolatile memory upon a set of the Station Commit to NVMEM object. Each APB is initially programmed with default values for each object. The default values allow a new button to be found when added to the network.

TABLE 1

Phase Status OID definitions

| Node | OID | Type | Description |
|---|---|---|---|
| pcs device node | 1.3.1.4.1.1206.4.2.14 | | Root node for PCSs |
| Phase Status Don't Walks | pcs.2.1 | Bits | Bits. If set to 1 that phase is in the don't walk state |
| Phase status Ped Clears | pcs.2.2 | Bits | Bits. If set to 1 that phase is in the Ped clear state |
| Phase Status Walks | pcs.2.3 | Bits | Bits. If set to 1 that phase is in the Walk state |
| Phase Status Calls | pcs.2.4 | Bits | Bits. If set to 1 that phase has a call pending |
| Phase Status APS Calls | pcs.2.5 | Bits | Bits. If set to 1 that phase has an APS call pending |
| Phase Status Beacon Source | pcs.2.6 | Bits | The source of an APS call |
| Phase Status Beacon Destination | pcs.2.7 | Bits | The Destination of an APS call |
| Phase Status Block Object | pcs.2.8 | OS | Octet string containing all of the phase status objects |

TABLE 2

Station Status OID Definitions

| Node | OID | Type | Description |
|---|---|---|---|
| pcs device node | 1.3.1.4.1.1206.4.2.14 | | Root node for APBS |
| Phase Status Don't Walks | pcs.3.1 | Bits | Bits. If set to 1 that phase is in the don't walk state |
| Phase status Ped Clears | pcs.3.2 | Bits | Bits. If set to 1 that phase is in the Ped clear state |

TABLE 3

Station Trap OID definitions

| Node | OID | Type | Description |
|---|---|---|---|
| Device OID | 1.3.6.1.6.3.1.1.4.1 | OID | SNMP Trap OID |
| Phase Status Calls | pcs.2.4 | Bits | Bits. If set to 1 that phase has a call pending |
| Phase Status APS Calls | pcs.2.5 | Bits | Bits. If set to 1 that phase has an APS call pending |
| Station Audio Message | pcs.3.1 | Int | Audio Message Number |
| Station State | pcs.3.2 | Int | Station State Number |

TABLE 4

Configuration OID definitions

| Node | OID | Type | Description |
|---|---|---|---|
| pcs device node | 1.3.1.4.1.1206.4.2.14 | | |
| Station ID | pcs.1.1 | Int | Station ID number. Values 1-16 (0 for not configured) |
| Station Night Mode | pcs.1.2 | Int | 1 If night mode is on |
| Station Day Locator Volume | pcs.1.3 | Int | Values 0-100 |
| Station Day Speech Volume | pcs.1.4 | Int | Values 0-100 |
| Station Night Locator Volume | pcs.1.5 | Int | Values 0-100 |
| Station Night Speech Volume | pcs.1.6 | Int | Values 0-100 |
| Station IP Address | pcs.1.7 | OS | 4 byte octet string of the stations IP address |

TABLE 4-continued

| Configuration OID definitions | | | |
|---|---|---|---|
| Node | OID | Type | Description |
| Station Mode | apb.1.8 | Int | 0-4 AAPS operation Mode |
| Station Identify | pcs.1.9 | Int | 0 for identify off. 1 for LED blink/vib |
| Station Phase | pcs.1.10 | Bits | Bit corresponds to Station's phase |
| Station Group | pcs.1.11 | Bits | Bit corresponds to Station's Group |
| Station Beacon Mode | pcs.1.12 | Int | AAPS Beacon operational Mode |
| Station Commit to NVMEM | pcs.1.13 | Int | 1 saves to configuration to non-volatile memory |

Figure 6:
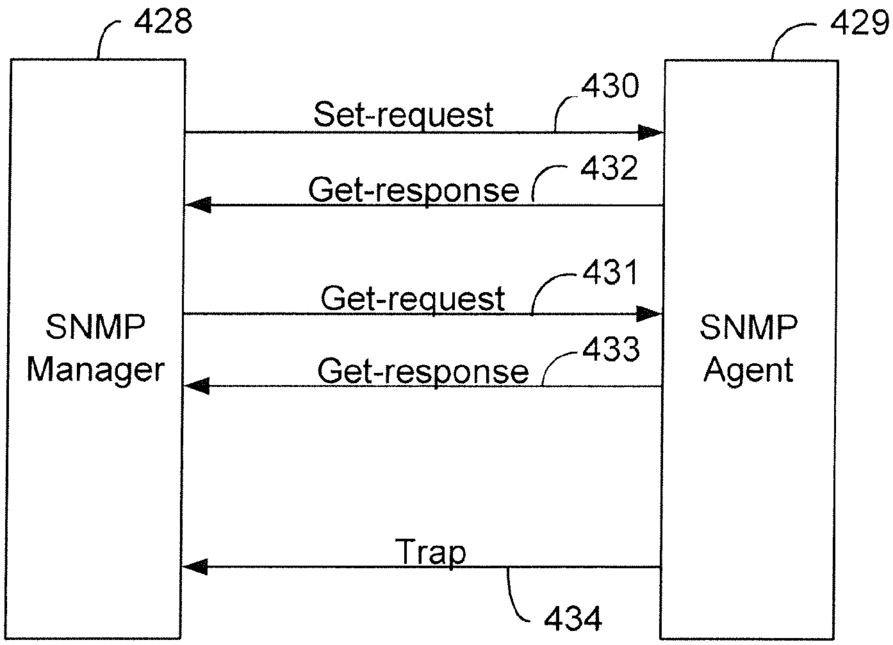
FIG. 6 is a schematic block diagram illustrating messaging between an SNMP Agent and an SNMP Manager.

Representative AAPS messaging is illustrated in FIG. 6. An SNMP manager 428 (e.g., a PMU) is configured to send a Set-Request command 430 or a Get-Request command 431 to an SNMP agent 429 (e.g., a PCS) and the agent responds to both requests with a Get-Response message 432 or 433. The agent 429 can also send an unsolicited Trap message 434 to a manager to indicate that a variable value at the agent has changed. AAPS variable values can be stored in a database which defined by Management Information Base (MIB).

Some system variables are specified by the National Transportation System for Communications ITS Protocol (NTCIP). Other systems variables conform to the NTCIP format for custom variable that allow the additional vendor specific variables. Such custom variables are required whenever the necessary variables are not defined by the NTCIP. Selected variables received from the phaseStatusGroupEntry objects and associated with signal phases and pedestrian service calls are listed in Table 4. Typically, a PMU collects data regarding pedestrian crossing states and rebroadcasts this data to the PCSs. If an Ethernet connection to the traffic controller is unavailable, the PMU establishes variable values using inputs that are hardwired to traffic controller outputs.

While the variables of Table 5 can be used in the disclosed systems, additional AAPS functionality can be provided based on additional traffic controller variables such as those listed in Table 6. The phaseStatusGroupAPSCall object is used to track pedestrian initiated calls, the groupStatusGroupAPSBeaconSource object specifies which specific button at the intersection originated the AAPS call, the groupStatusGroupAPSBeaconDestination object specifies a user destination, the APSnightMode object is associated with setting one or more PCSs into a night mode in which audio volume is reduced, and a button Status APSAudioMessage object indicates which audio message (see Table 7) a specific PCS is currently playing. Audio messages can be of arbitrary length subject to memory limitations, and are indicated as shown in Table 7 by a single decimal digit. In other examples, more or fewer messages can be provided. A particular audio message can be selected from a service computer and can be loaded into the AAPS, using a web browser interface. Messages can be communicated to and stored at one or more of the PCS. A web interface is convenient, and audio messages (audio files) can be transferred using ftp or other transfer media such as HTML multipart form data format which is described below. Table 8 lists several AAPS configuration options.

TABLE 5

| phaseStatusGroupEntry variables | |
|---|---|
| Variable | Description |
| phaseStatusGroupWalks | Pedestrian Walk Symbol Status |
| phaseStatusGroupDontWalks | Pedestrian Don't Walk Symbol Status |
| phaseStatusGroupPedClears | Pedestrian Flashing Don't Walk Symbol Status |
| phaseStatusGroupPedCalls | Pedestrian Call Request Status |

TABLE 6

| Custom MIB objects used by the AAPS | |
|---|---|
| Variable | Description |
| phaseStatusGroupAPSCalls | AAPS Call Request Status |
| groupStatusGroupAPSBeaconSource | Origin of AAPS request |
| groupStatusGroupAPSBeaconDestination | Destination of AAPS request |
| APSnightMode | AAPS night mode operation |
| buttonStatusAPSAudioMessage | Current audio message playing |

TABLE 7

| Audio Messages | |
|---|---|
| Audio Message Number | Description |
| 1 | Locator Tone |
| 2 | Wait message |
| 3 | Chirp |
| 4 | Cuckoo |
| 5 | Location Message |
| 6 | Acknowledgement |
| 7 | Clearance |
| 8 | Beacon message |
| 9 | Custom |

TABLE 8

| AAPS User Configuration Options | |
|---|---|
| Setting | Description |
| Base audio volume | Audio message volume before ambient noise compensation |
| Pedestrian phase | Which pedestrian phase a specific PCS belongs |
| APS group | Used to associate PCSs with each other for AAPS source and destination beaconing |

TABLE 8-continued

| AAPS User Configuration Options | |
|---|---|
| Setting | Description |
| APS hold | Amount of time the user must hold the button on the PCS before it is considered an AAPS call |
| APS group beacon type | PCS beaconing chirp or cuckoo per APS group |
| Night time mode | Time of day when PCSs should operate in night mode |
| Output mode | PCS audio/vibrotactile output for each pedestrian signal state (walk, clear, don't) |
| Beacon enable | Enable or disable PCS APS source and destination beaconing |

Figure 7:
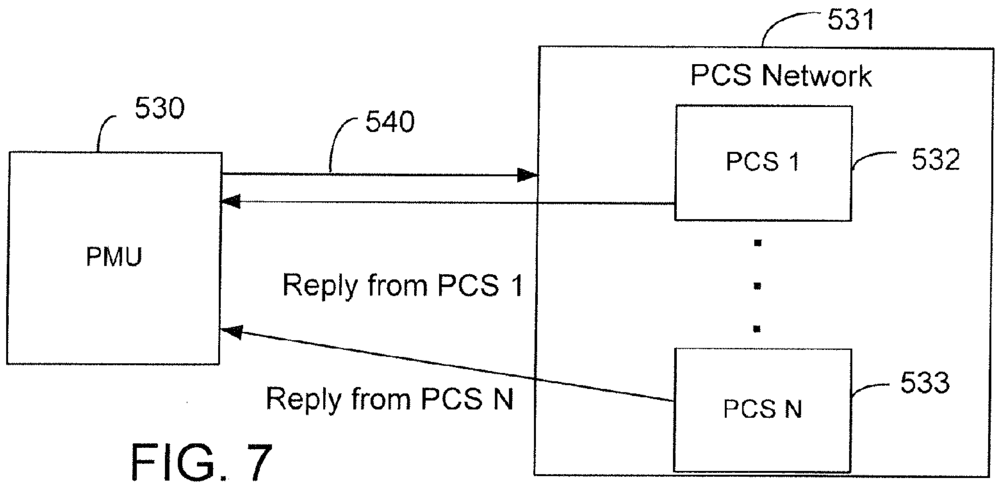
FIG. 7 is a schematic block diagram illustrating messaging between a Pedestrian Management Unit (PMU) and a plurality of Pedestrian Call Stations (PCSs).
Figure 8:
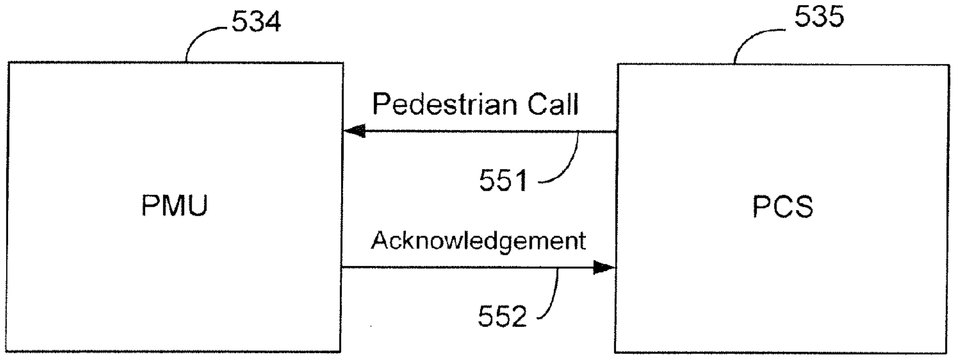
FIG. 8 is a schematic block diagram illustrating a pedestrian call from a PCS and an acknowledgment from a pedestrian management unit (PMU).
Figure 9:
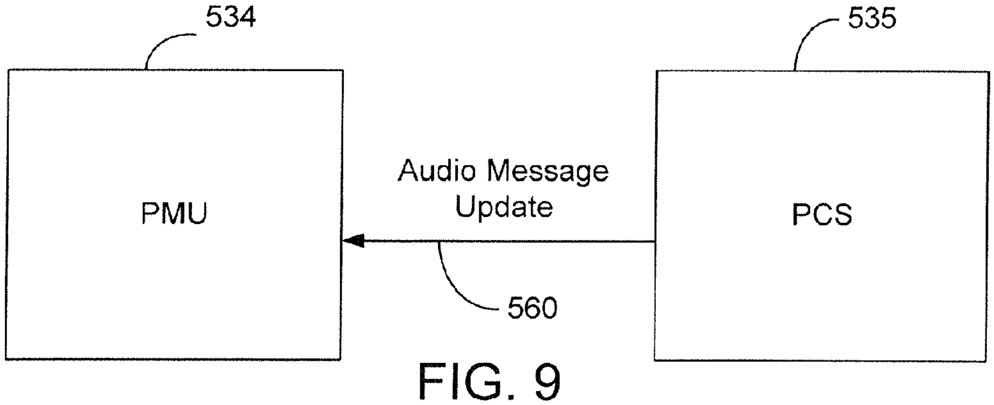
FIG. 9 is a schematic block diagram illustrating an audio update message from a PCS to a PMU.

FIGS. 7-9 illustrate AAPS communications between a PMU and one or more PCSs. Referring to FIG. 7 a PMU 530 transmits a message 540 to a PCS network 531 to update each with a current state of pedestrian signals. The PMU 530 rebroadcasts such a message including pedestrian signal state, pedestrian requests, day or night mode, and APS call information periodically (in one example, about every 250 ms) to all PCSs. Each PCS such as representative PCSs 532, 533 respond to the PMU 530. If a particular PCS does not respond, the PMU 530 reports the lack of response, and the AAPS can signal a traffic controller of a malfunction.

FIG. 8 illustrates communication of a pedestrian call message 551 from a PCS 535 to a PMU 534, and an acknowledgment message 552 sent in response by the PMU 534. The acknowledgement message 552 can be an explicit message or contain the information in the next scheduled status update. The acknowledgement can include current state of responses to pedestrian requests so that the PCS 535 can play the correct audio message at an appropriate time. FIG. 9 illustrates an audio update message 560 that is transmitted from the PCS 535 to the PMU 534. The message 560 indicates which message is playing. Typically, if a permissive message is being played ("walk light is on") the PMU 534 is notified periodically at about once per second. For other messages, periodic updates may be used, but the PMU 534 is notified only when the message is changed.

Figure 10:
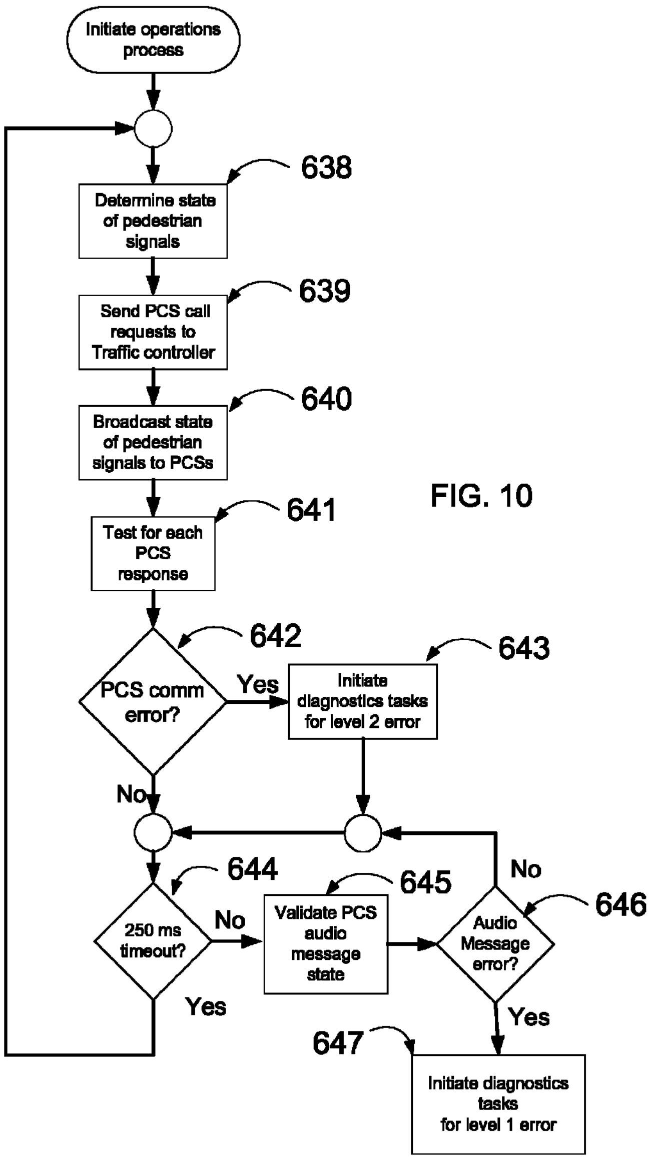
FIG. 10 is a schematic block diagram illustrating initiation of AAPS operation.

FIGS. 10-18 are functional block diagrams that illustrate operation, maintenance, and diagnostics for an AAPS. Typical operation is illustrated in FIG. 10. In a step 638, the state of pedestrian signals is determined, and in step 639 one or more PCS call requests is communicated to the traffic controller. In a step 640, the status of pedestrian signals is broadcast to the PCSs, and in a step 641, a determination is made as to whether or not the PCSs have responded appropriately. If an error is detected in step 642, diagnostics are initiated in a step 643. As described herein, a loss of communication is referred to as a "level 2" error. Errors that pose more serious safety risks are referred to as "level 1" errors. If a PCS does not respond, the PMU records the loss of communication and continues to operate. If a communication error is not detected, in step 644 a time out determination is made. If a predetermined time (for example, for a pedestrian crossing) has not elapsed, a current PCS audio message is verified in a step 645. An audio error determination is made in a step 646, and diagnostics initiated in a step 647 if an audio error is detected.

Figure 11:
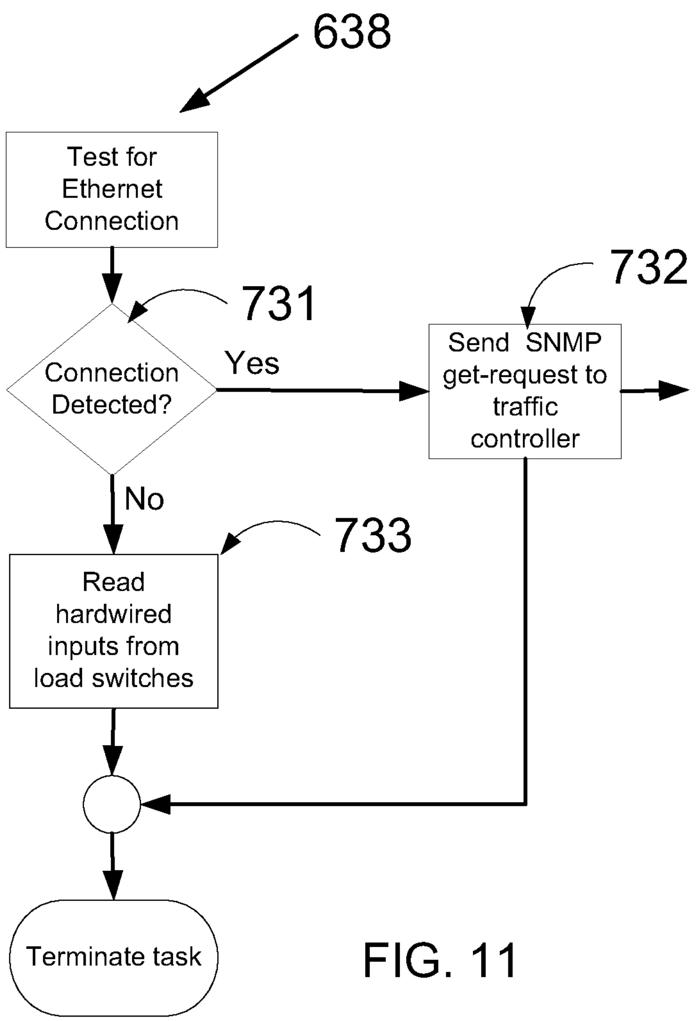
FIG. 11 is a schematic block diagram illustrating determination of pedestrian signal status.

Referring to FIG. 11, the step 638 of determining pedestrian signal states includes a step 731 of determining whether an Ethernet connection is available. If so, in step 732 a SNMP get-request is sent to the traffic controller using the Ethernet connection demonstrated in FIG. 2 to update the variables listed in Table 1. If Ethernet connection is unavailable, in a step 733 hardwired inputs are interrogated to determine signal states. If the traffic controller outputs are interrogated due to the unavailability of an Ethernet connection, variable values for variables such as those listed in Table 1 are updated.

Figure 12:
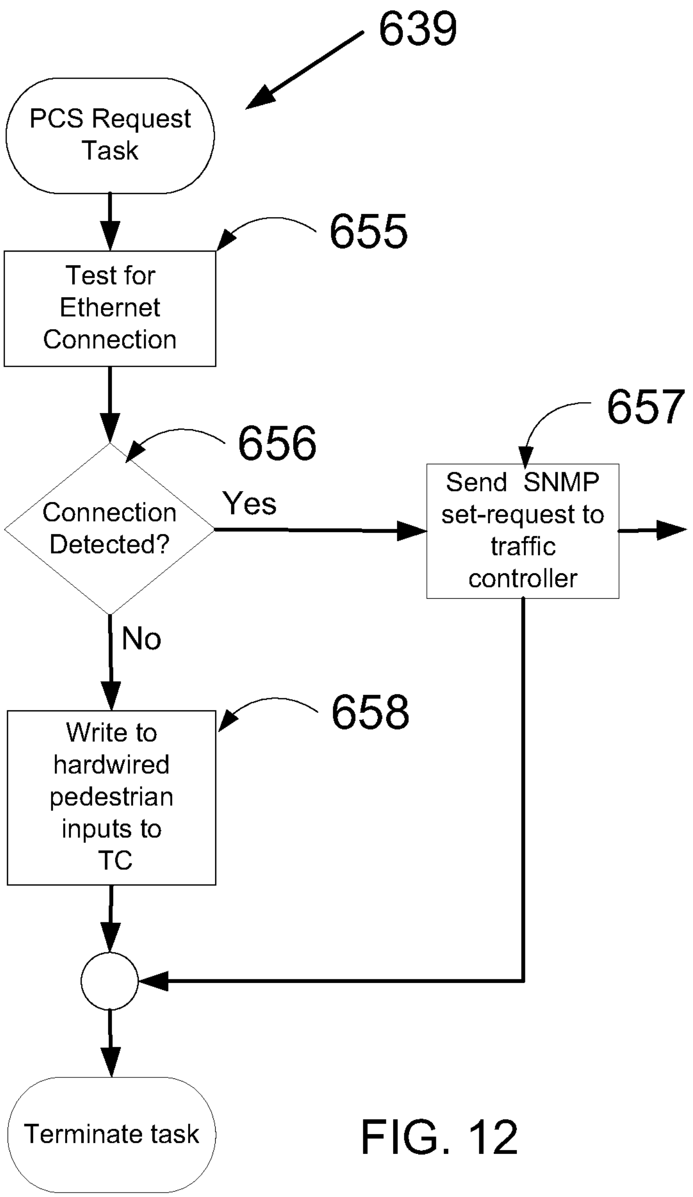
FIG. 12 is a schematic block diagram of a representative procedure for sending call requests from a PCS to a traffic controller.

Referring to FIG. 12, the step 639 of sending call requests to the traffic controller includes a step 656 of determining if there is an available Ethernet connection and if so, in a step 657 sending an SNMP set-request to the traffic controller. If such a connection is unavailable, a request is initiated via a hardwired output to the traffic controller inputs in a step 658.

Figure 13:
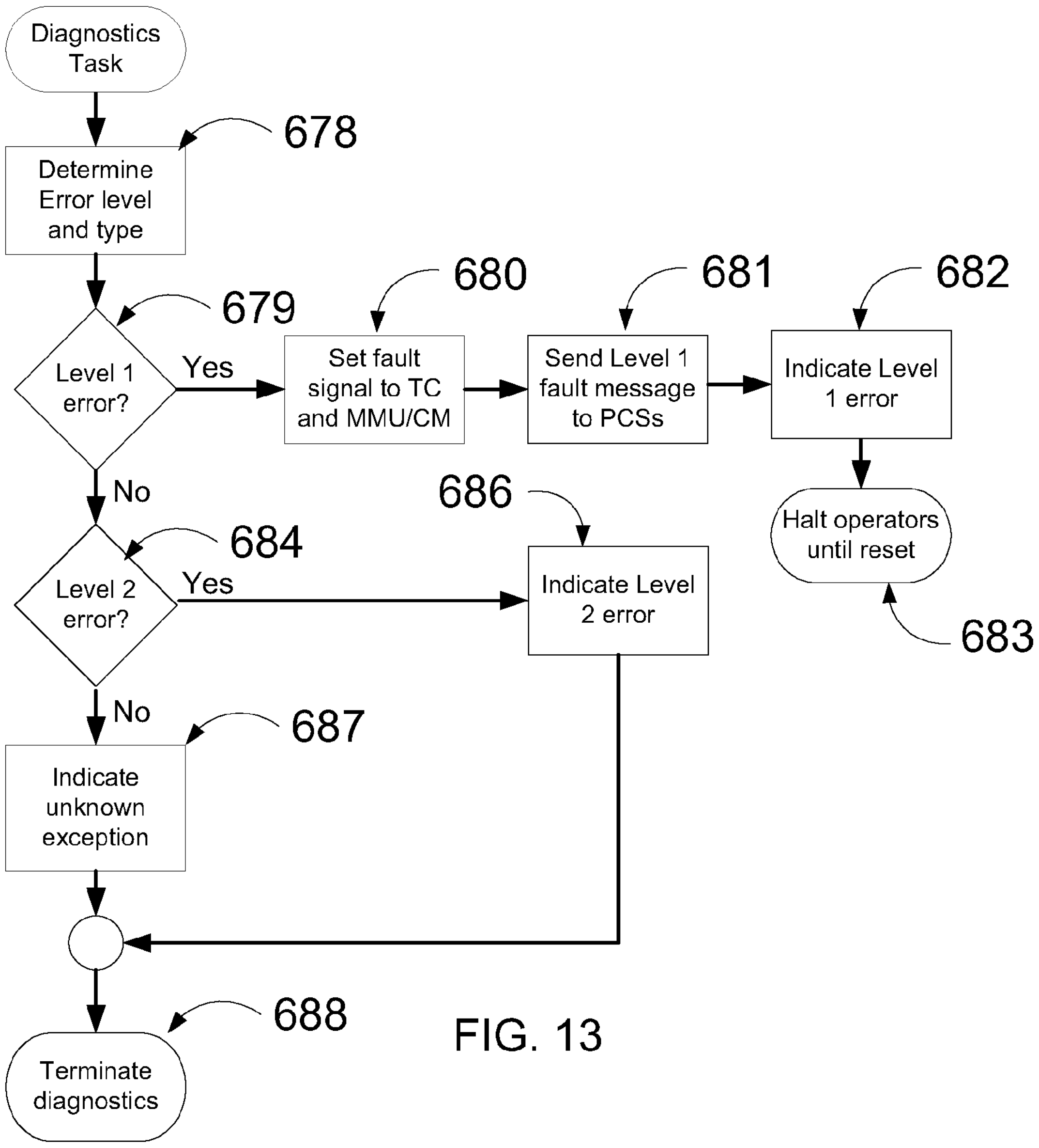
FIG. 13 is a schematic block diagram of a representative error diagnostics procedure.

A representative diagnostic method is illustrated in FIG. 13. In a step 678, an error level or type is determined. In a step 679, detection of a level 1 error initiates a sequence that include sending a set fault signal to a traffic controller and MMU/CM in a step 680 and a fault message to the PCSs in a step 681. As described herein, a level 1 error is any error that is indicative of an unsafe operating condition (for example, playing an incorrect audio message, or otherwise indicating safe passage without proper traffic signal control). In a step 682, audio messages are disabled in a step 683, and operation is halted until manually reset in a step 683. In a step 684, level 2 errors are detected, and an indication of such an error is generated in a step 686 as a message on an LCD or LED array, or other suitable display device, typically by indicating which PCSs are not communicating. For other errors, error codes can be indicated in step 687, but the AAPS continues to operate. In a step 688, diagnostic procedures are terminated. Errors can be divided into various groupings, and responses to the various groupings tailored as desired, and the use of only level 1 and level 2 errors is for illustration only.

Figure 14:
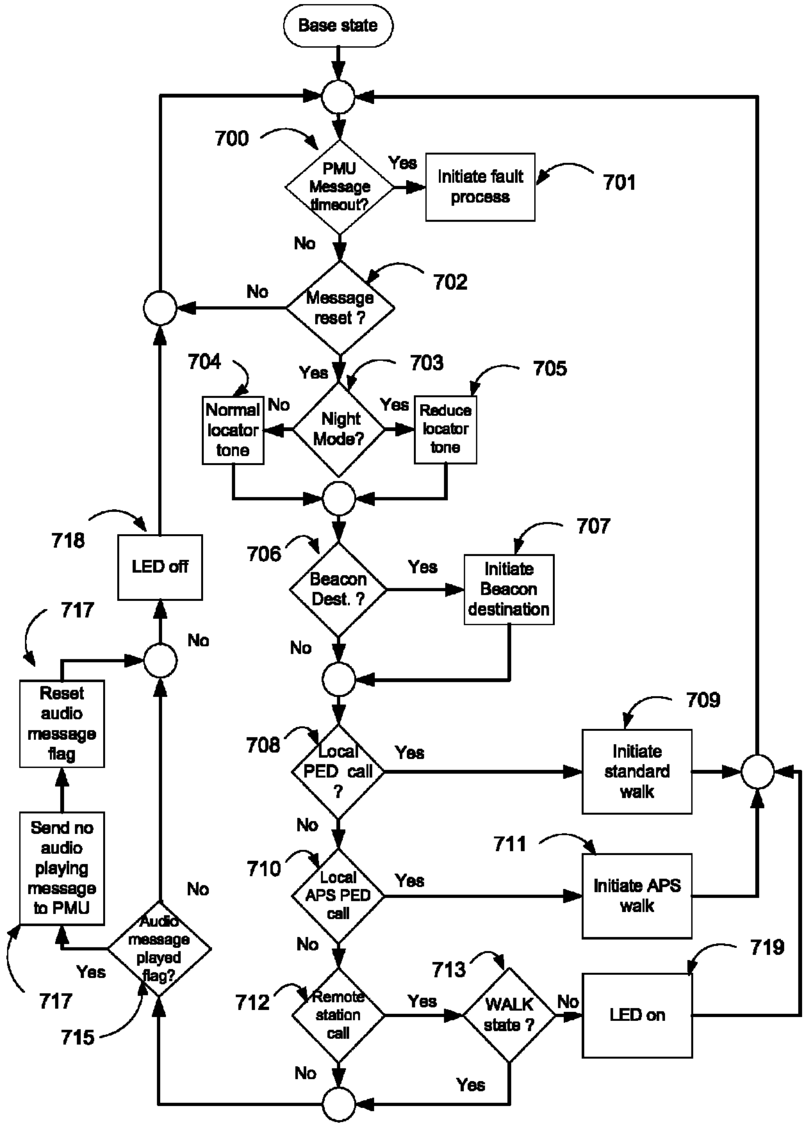
FIG. 14 is a schematic block diagram of a representative method of processing a pedestrian call.

A PCS is generally configured to operate in a base state, a beacon destination state, a standard call state, and an APS call state. Base state operation is illustrated in FIG. 14 and generally begins after PCS initialization. A PCS checks for recent messages (within 250 ms) from the PMU in step 700. If no message has been received, a fault detection procedure is initiated in step 701 (illustrated further in FIG. 18). There is no recovery from this fault process apart from a power-up reset. In step 702, a determination is made as to whether a new message has been received. If a new message has not been received, the PCS returns to step 700 to continue to check for messages. If a new message is received, PCS variables such as those in Tables 4-5 are updated. Typically, each PCS decodes a PMU message to obtain data bits pertinent to an associated crosswalk, and each PCS transmits an acknowledgment to the PMU. In step 703 day or night mode is selected (or a previous selection confirmed) and normal volume or reduced volume for audio messages is selected in steps 704 and 705. Representative audio messages are listed in Table 6. In a step 706, a bit associated with each PCS of the groupStatusAPSBeaconDestination message is checked. If this bit is checked, a beacon destination process 707 (illustrated in FIG. 15) is initiated. In step 708, a pedestrian call is evaluated to determine if it is a local pedestrian call or an APS pedestrian call. Typically, a duration of a pedestrian button press can be used—a short press (less that about 1-2 s) corresponds to standard pedestrian call and a standard walk sequence 709 (illustrated in FIG. 16) is initiated. In a step 710 a pedestrian call is evaluated to determine if it is an APS pedestrian call. Typically, a button press of greater than about 2 s is associated with an APS call, but press durations for standard and APS calls can be programmed or otherwise set at different values. If an APS call is detected, an APS walk sequence (illustrated in FIG. 17) is initiated. If an APS call is not detected, a PCS bit of the phaseStatusGroupPedestrianCalls message from the PMU is evaluated in a step 712. If a remote call has been detected in the step 712, and the WALK state is active as determined in a step 713, the audio message flag is checked in a step 715. If no audio message is playing, a message is sent to the PMU informing the PMU that no message is playing, and the audio message flag is reset in a step 717. If no audio message has been played, the LED is turned off in a step 718, and the step 700 is repeated. If in a step 713 the WALK state is not active, the LED is turned on and the step 700 is repeated.

Figure 15:
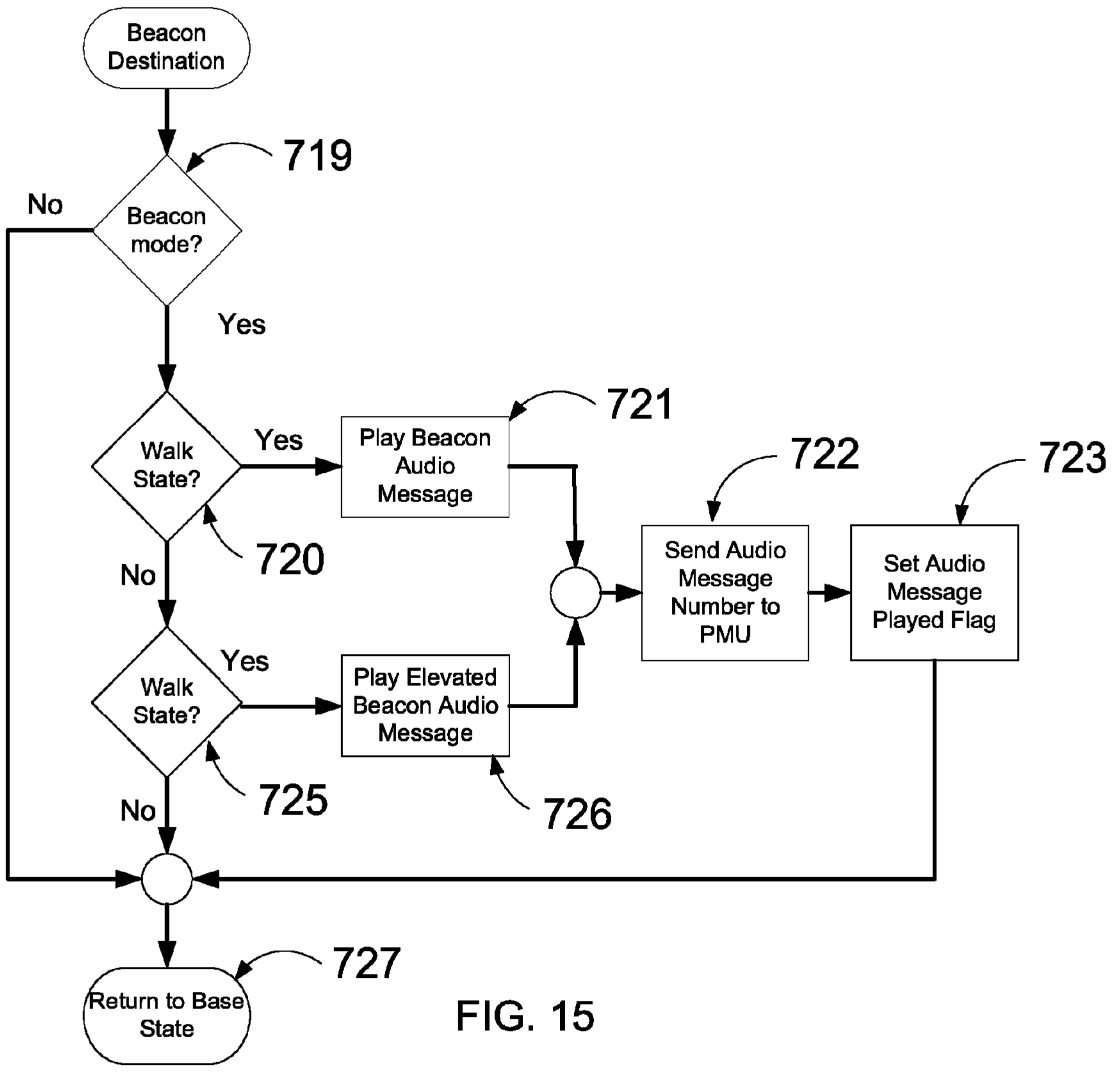
FIG. 15 is a schematic block diagram of a representative beaconing procedure.

A beacon destination process is illustrated in FIG. 15. This process is typically initiated at a PCS that is opposite the PCS from which a call is made, and thus is an intended pedestrian destination. In a step 719, the PCS is checked to determine if it can serve as a beacon. If not, the procedure returns to base state operation in a step 727. If it can provide a beacon, in a step 720 the WALK status of the PCS is checked. If the PCS is in a WALK state, a beacon message is played in a step 721. If a pedestrian clear state is active (provided to warn a pedestrian that a WALK state is nearing completion—a pedestrian clearance phase) as determined in step 725, an elevated volume beacon message in played in step 726. After either beacon audio message is initiated, the PCS periodically sends the audio message number of the message being played to the PMU (at about 1 Hz) in a step 722 and sets an audio message played flag in a step 723. This beacon process continues until the WALK and PED CLEAR bits in the phaseStatusGroupWalks and the phaseStatusGroupClears variables sent by the PMU to the PCS change, i.e., until the WALK and PED CLEAR intervals have elapsed. If the PMU detects that an incorrect message has been played, an error procedure can be initiated.

Figure 16:
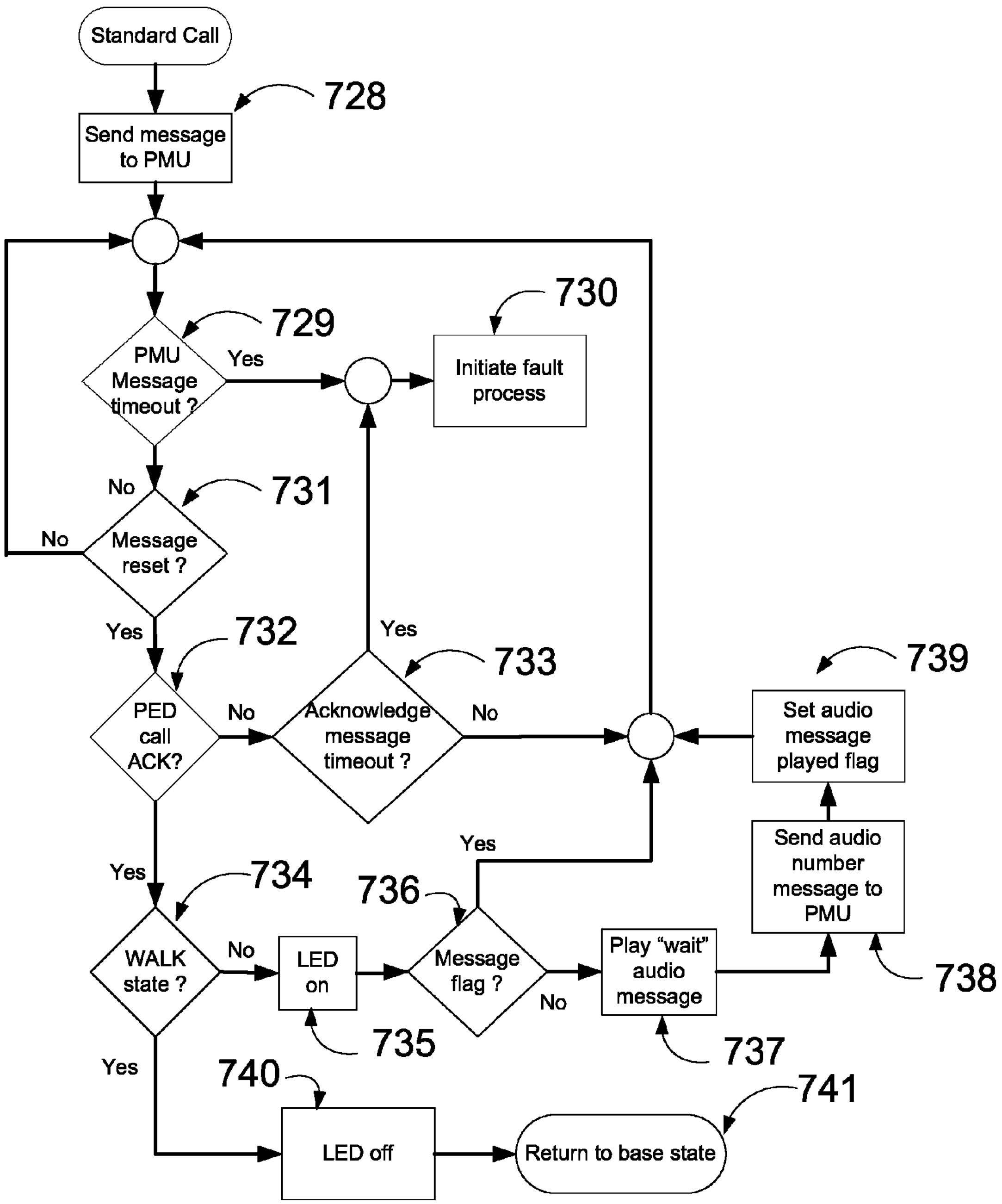
FIG. 16 is a schematic block diagram illustrating a standard pedestrian call.

FIG. 16 illustrates a standard call process. In a step 728, the PCS sends a message to the PMU indicating that a call has been made at the PCS. The PCS checks that a timeout has not occurred in a step 729. If a timeout has occurred, a fault process 730 (illustrated in FIG. 18) is initiated. In a step 731, the PCS checks for receipt of a new message. If none has been received, the process returns to the step 729. Receipt of a pedestrian call acknowledgment from the PMU is determined in a step 732. If a message has been received but not acknowledged as determined in a step 733, the fault procedure 730 is initiated. The PCS determines if the WALK state is inactive in a step 734, and if so the pedestrian button LED is turned on in a step 735, and a message flag is checked in a step 736. If the WAIT message has not been played based on the message flag, the WAIT message is played in a step 737. In steps 738, 739 a message is sent to the PMU that the WAIT message is being played, and an audio message flag is set. If the WAIT message has been played, steps 729, 731, 732, 734, 735, and 736 repeat until the WALK state is active. If the WALK state is active, then the pedestrian button LED is turned off in a step 740, and the call returns to base state operation in a step 741.

Figure 17:
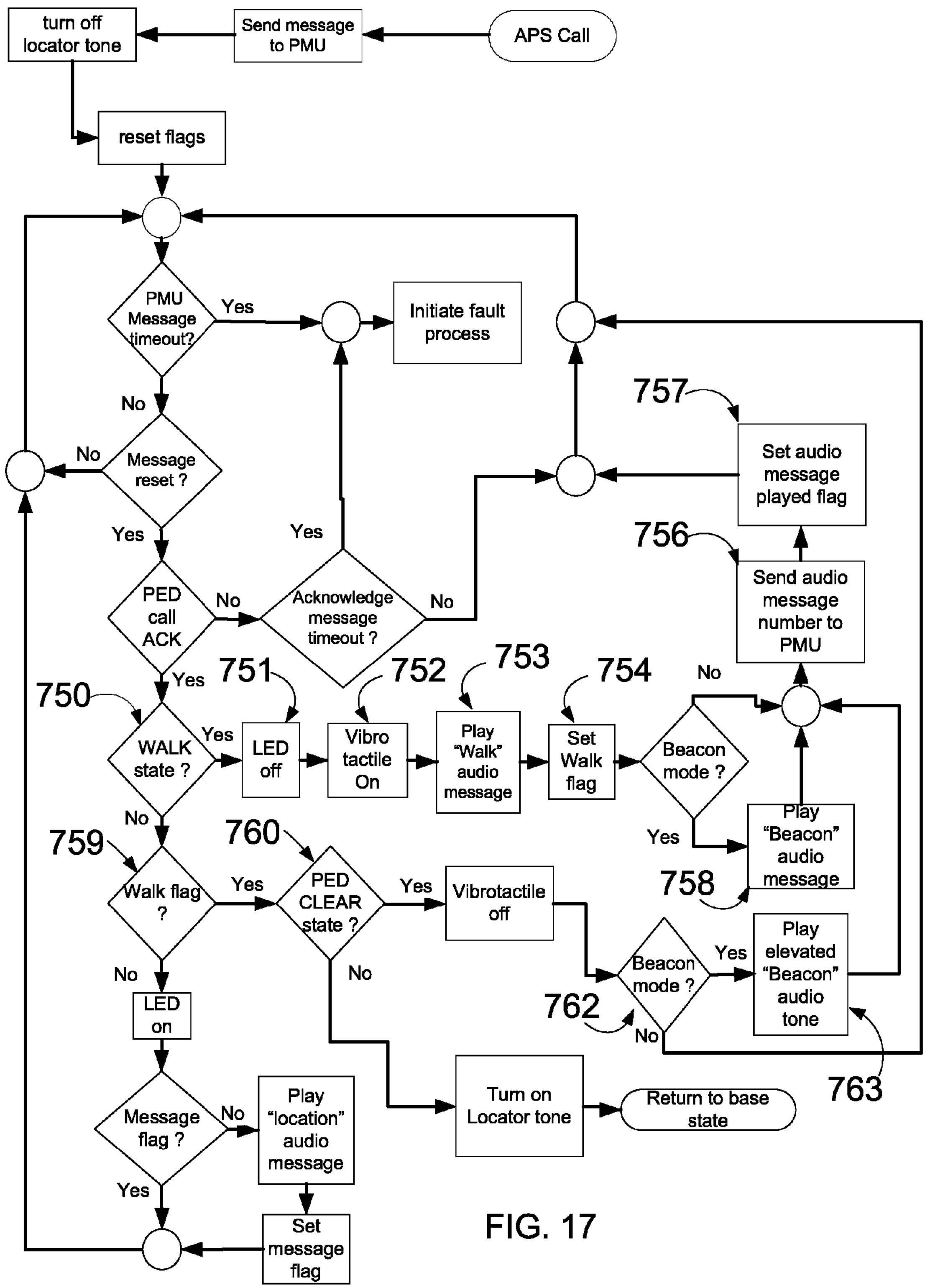
FIG. 17 is a schematic block diagram illustrating an APS call.

FIG. 17 illustrates an APS call sequence. As in other disclosed examples, message receipt between a PMU and a PCS is generally acknowledged. If an acknowledgment is not received, a fault process is initiated. Details of fault processing have been described previously and are not described further herein. As shown in FIG. 17, if an APS call message is generated at a PCS, in a step 750, a determination is made as to whether the PCS is in a WALK state. If so, an indicator LED associated with the PCS is turned off in a step 751, and a vibro-tactile device is turned on in step 752. A WALK message is played in a step 753, and a walk flag is set in a step 754 to indicate that the walk call request has been serviced. If a beacon mode is to be operated, a beacon audio message is played in a step 758, and an audio message identifier is sent to the PMU in a step 756 and an audio message played flag is set in a step 757. If beacon mode is not to be operated, the steps 756, 757 are executed without playing a beacon audio message. If the WALK state is not active, the processor checks for a PED clear state in step 760. Based on this check, the vibro-tactile output is turned off, a beacon mode 762 is entered in which an elevated volume for the beacon audio message is selected in a step 763.

Figure 18:
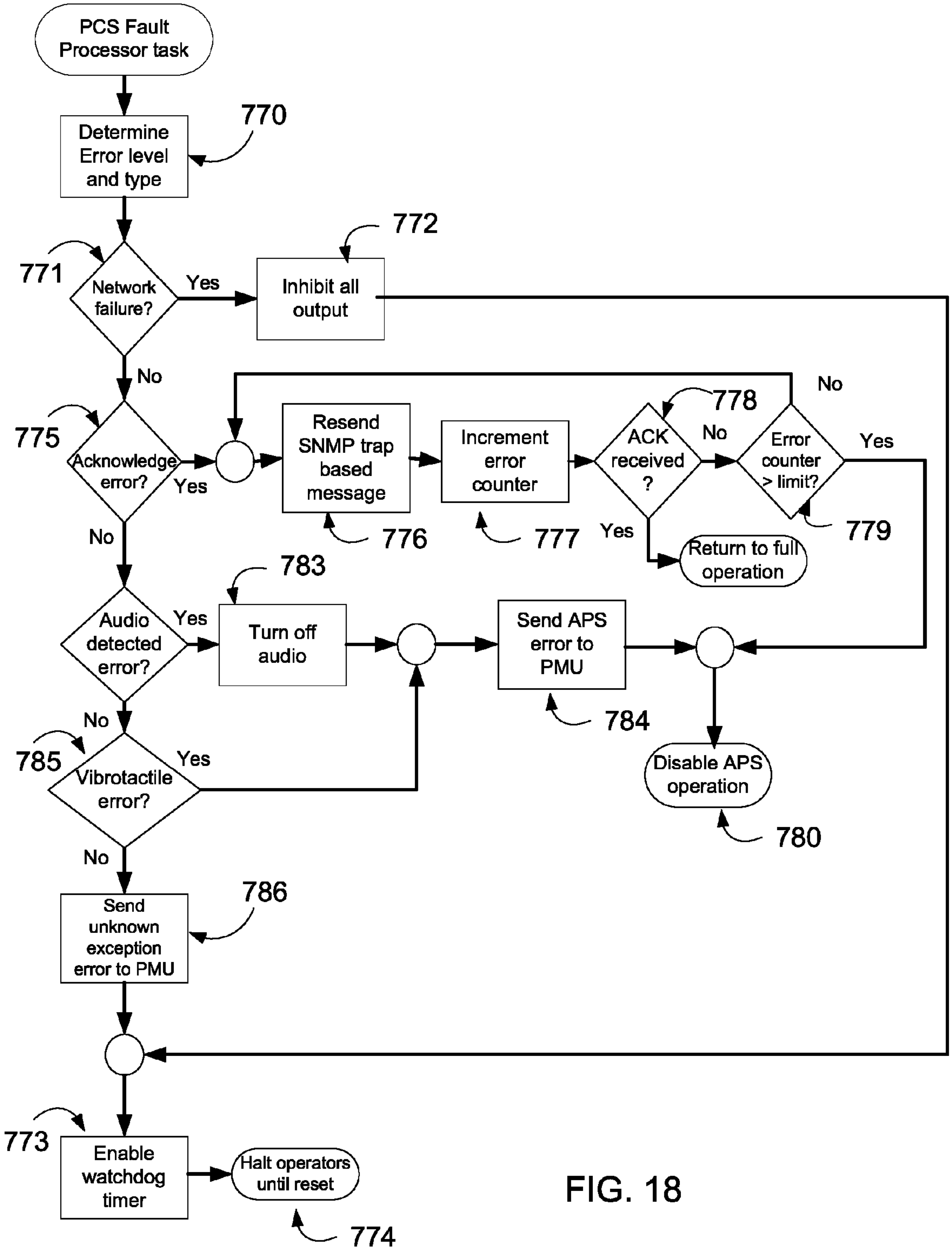
FIG. 18 is a schematic block diagram of a representative procedure for fault processing.

Error processing is illustrated in FIG. 18. If a network communication error is detected in a step 771, all audio outputs are halted in a step 772, and a watchdog timer is started in a step 773. Upon completion of the watchdog time, network operation halts if the error persists. If an acknowledgment error is detected in a step 775, the call message is resent in a step 776 and an error counter is incremented in a step 777. If acknowledgment is received to the resent message in a step 778, operation returns to normal. Otherwise, a series of attempts to made to resend the message, and when the number of errors exceeds a predetermined limit in a step 779, APS operation is disabled in a step 780. If an audio error or a vibro-tactile error is detected in steps 782, 785, an error message is sent to the PMU in a step 784 and APS operation is disabled in the step 780. If an audio error is detected, audio is turned off in the step 783. Additional errors can be detected in a step 786 and communicated to the PMU. Typically, the watchdog timer is initiated and operation halts if the error persists.

Representative Browser-Based Interface

Figure 19A:
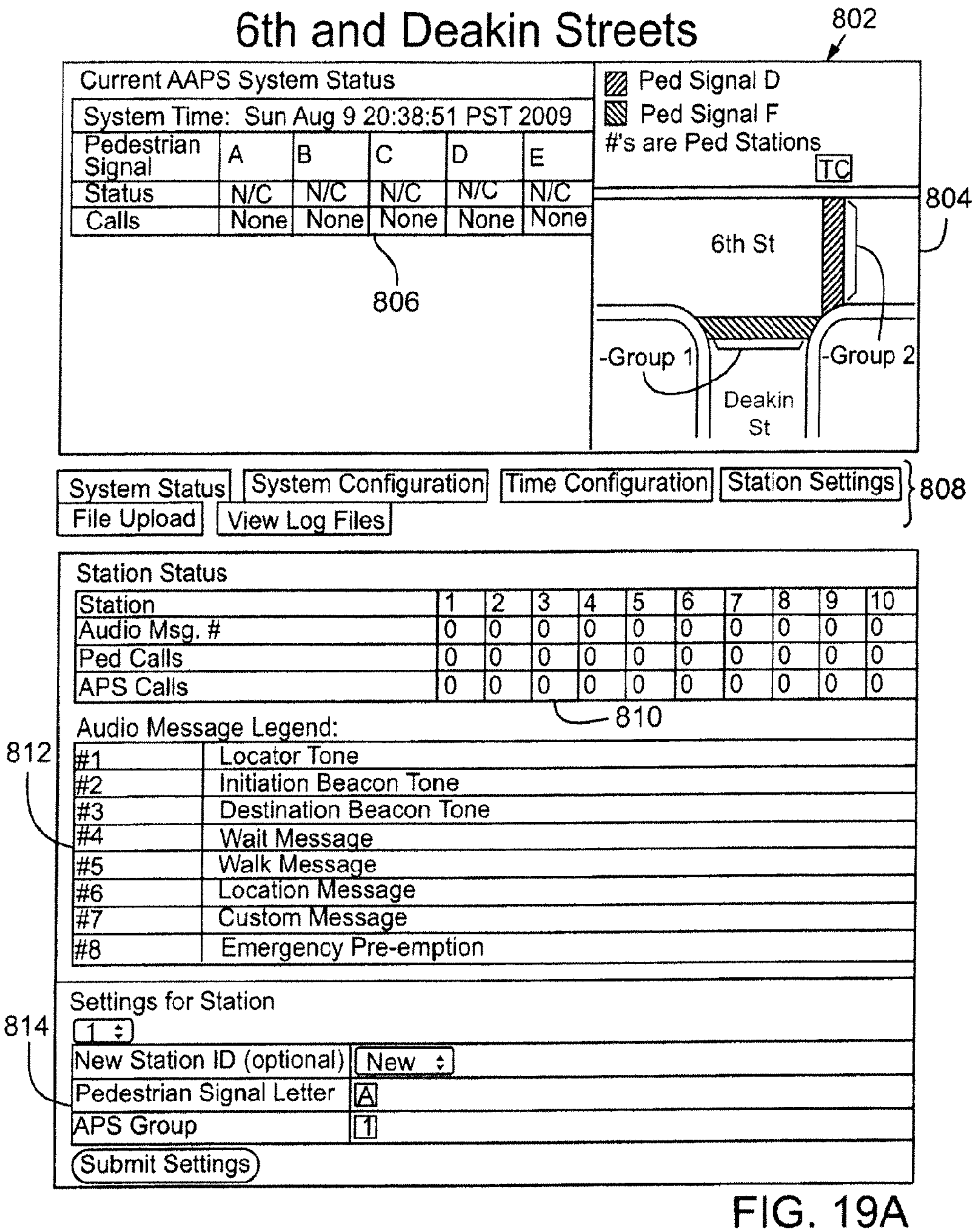

As noted above, maintenance, set-up, control, and other functions can be implemented using an Internet browser based interface for convenient system access from a variety of readily available computing platforms. FIGS. 19A-19F illustrate representative screen displays associated with representative available functions via the web pages hosted by the AAPS. Referring to FIG. 19A, a representative system status display includes a header display 802 that includes an intersection schematic 804 that indicates traffic signal groupings (Groups 1 and 2 associated with crossing Deakin St. and 6$^{th}$ St., respectively) and a signal status block 806 that indicates current status and calls to pedestrian signals. A series of tabs 808 are provided for user selection with a pointing device so that different functions and settings can be accessed. The header block 802 and the tabs 808 can be present on all pages.

Figure 19B:
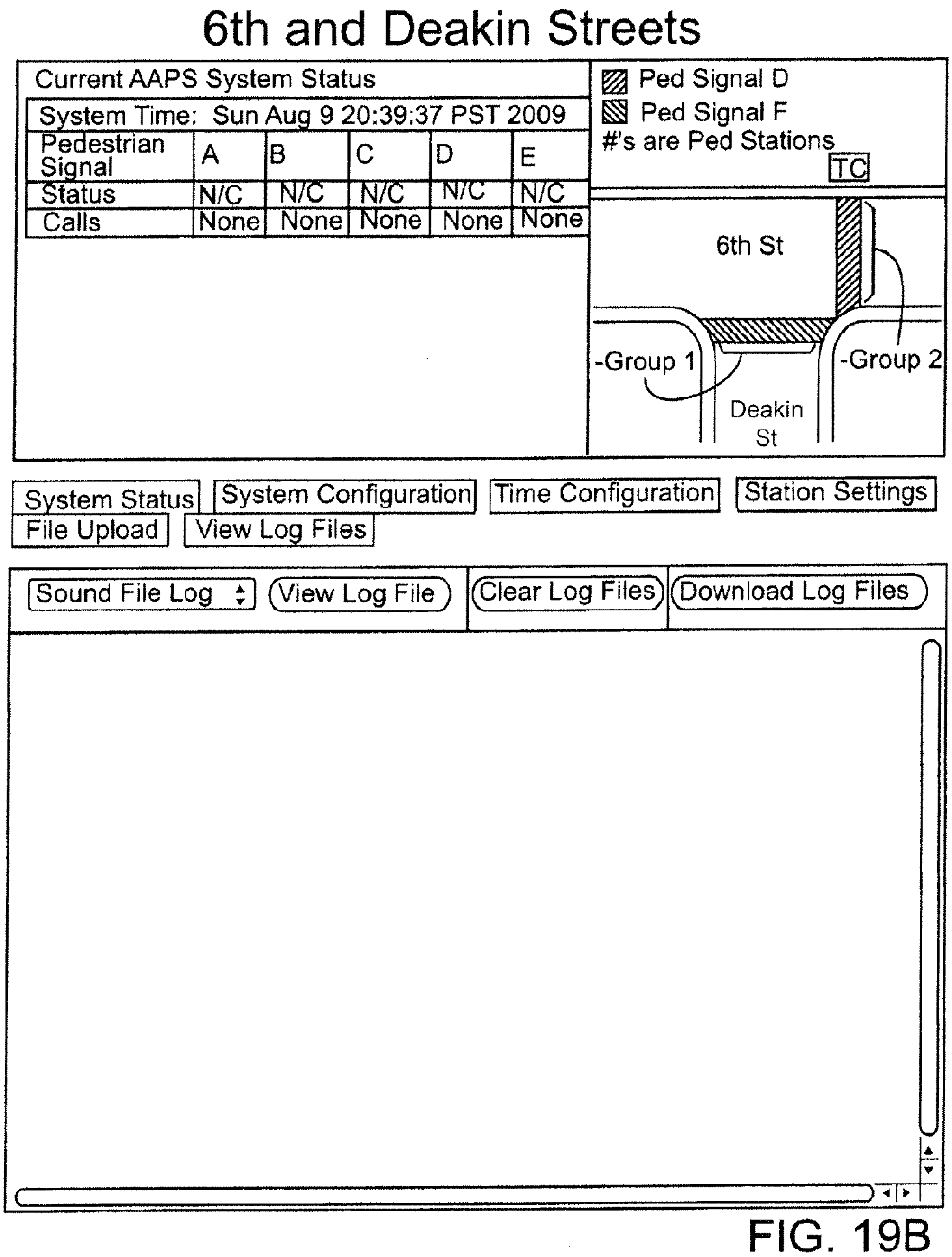
Figure 19C:
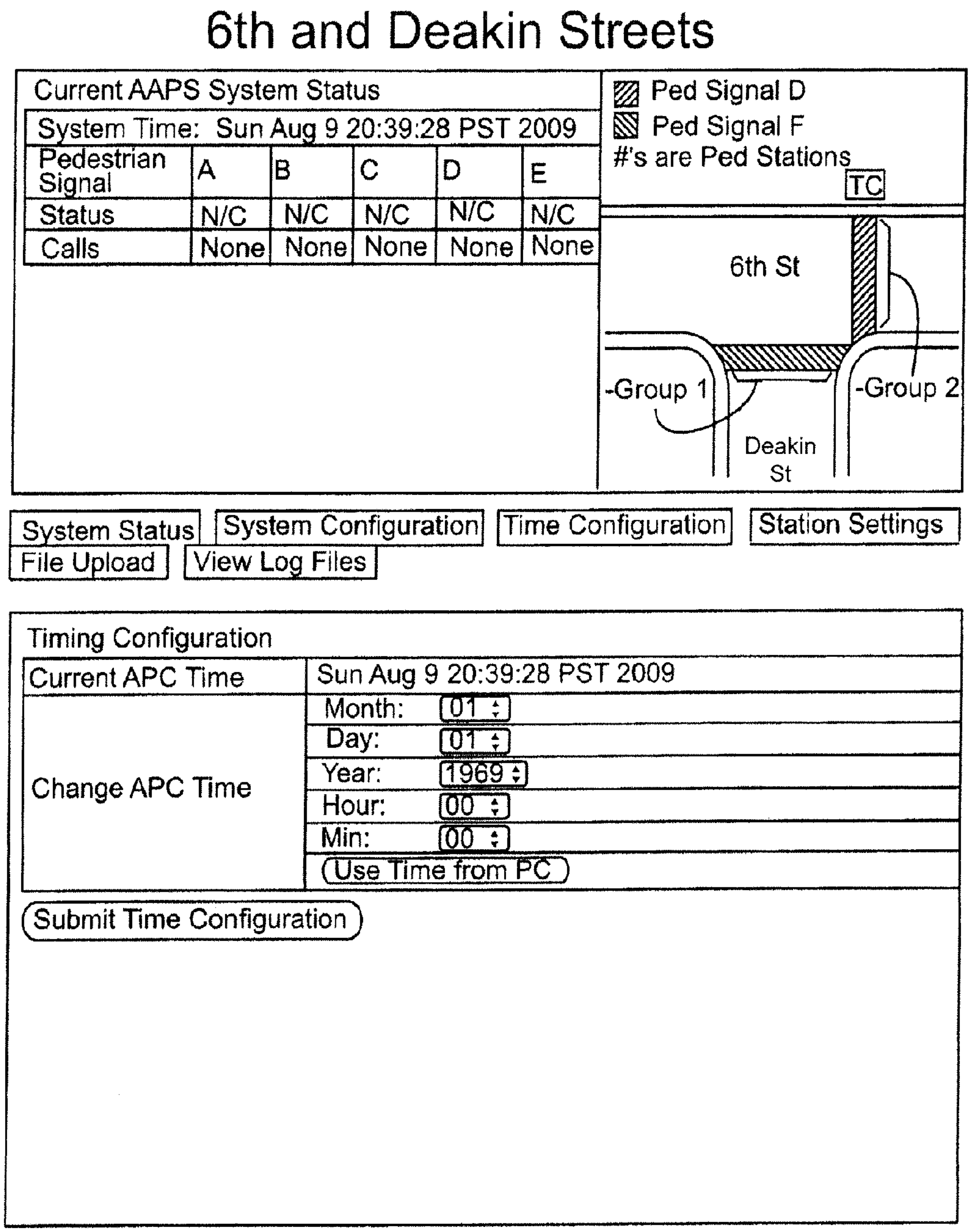

A status block 810 includes additional station status such as an audio message number, and numbers of standard and APS pedestrian calls. An audio message block 812 displays available audio messages by reference number (1-8 in this example) with a brief description of intended application. Station settings can be configured with a set-up display 814 that provides user selectable areas for station selection, a pedestrian signal alphabetical identifier, and group assignment. In another system status view shown in FIG. 19F, a legend 816 is provided for ease in determining signal status. FIG. 19B illustrates a screen display associated with viewing system log files, and FIG. 19C illustrates a screen display associated with setting system time.

Figure 19D:
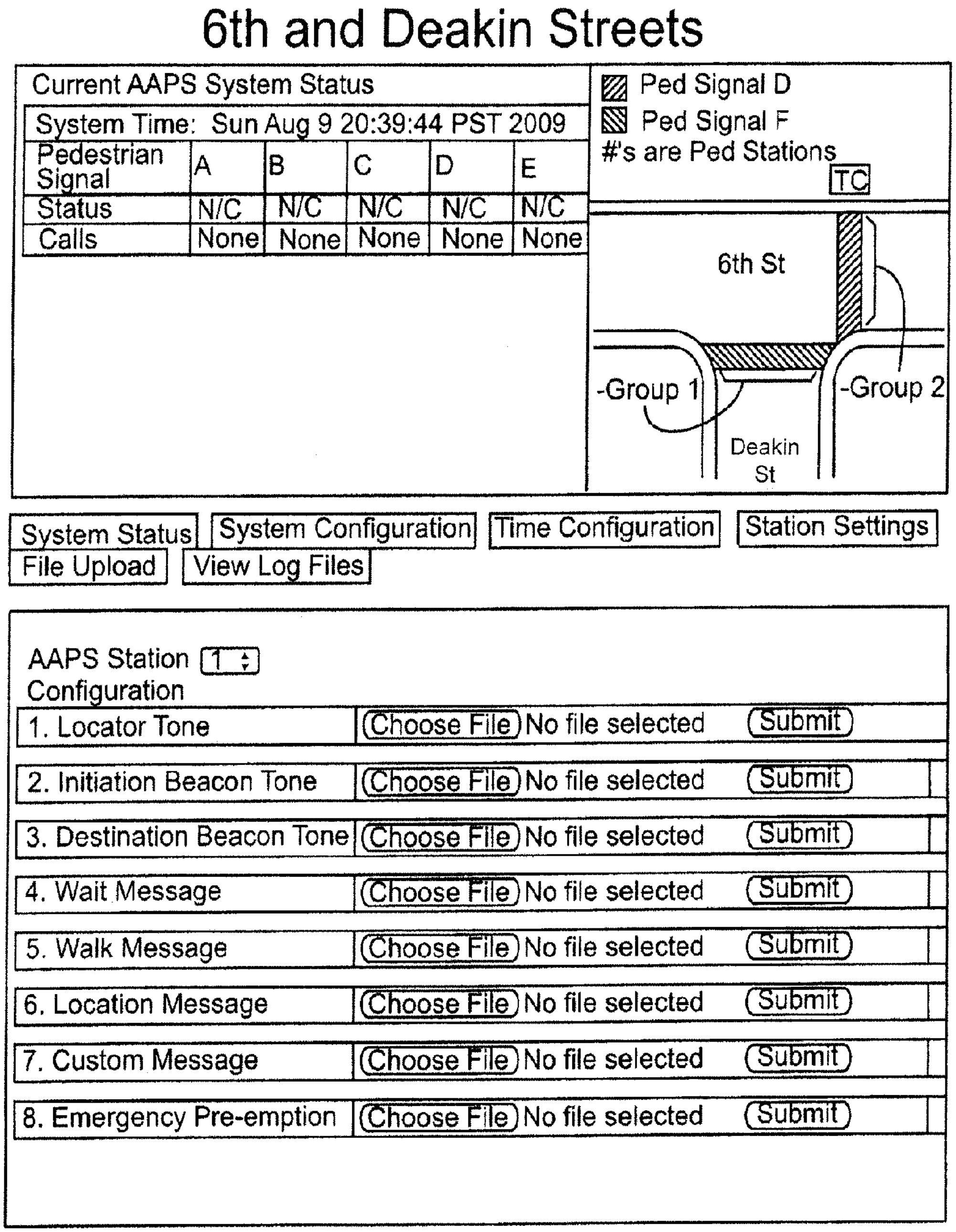
Figure 19E:
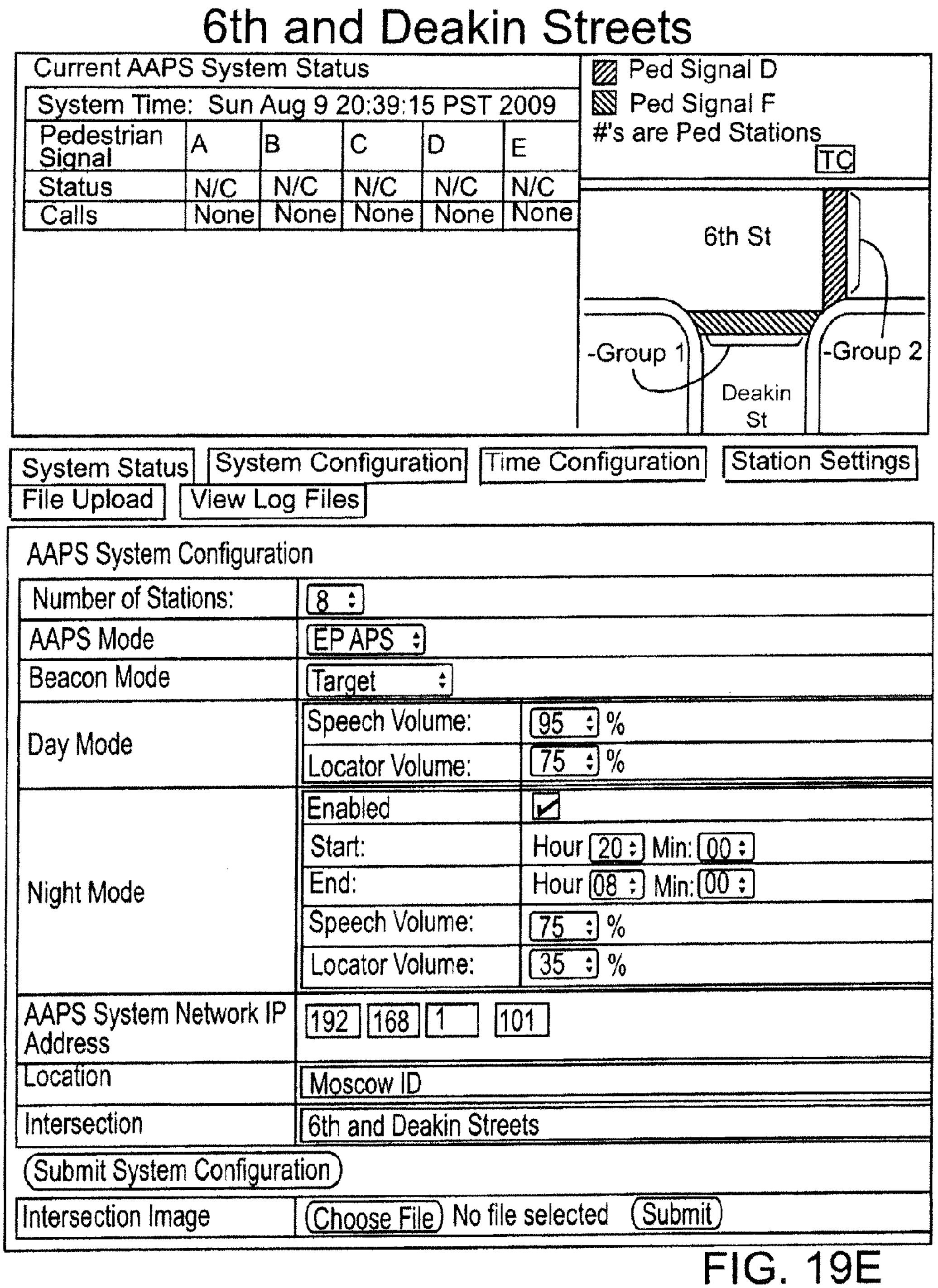

A web browser interface permits customization of audio messages by providing convenient file uploads in conjunction with the screen display of FIG. 19D. Audio messages or tones can be selected for a variety of system uses such as beacon tones for both a start or initiation location and a destination. FIG. 19E is a screen display that can be used for system configuration. Day/night mode audio volume, start and stop times, and a variety of other system parameters can be selected. An intersection photograph can be uploaded to visually depict the intersection and the associated traffic control devices. A network (IP) address can be provided. It will be apparent that other AAPS parameters and settings can be included.

Additional System Features and Operation

As disclosed in the examples above, AAPS configuration and diagnostics can be performed using a PC with a standard web browser and an Ethernet connection. A web page or series of web pages can provide real-time status of all controller inputs and the state of all pedestrian stations and identify an audio message currently being played. In one example, the system web page provides six tabbed pages: System Status, System Configuration, Time Configuration, Station Settings, File Upload, and View Log Files. The web pages organize data into three types: system operational status, configuration settings, and log files. Status information includes the state of PMU inputs and outputs as well as the state of all PCSs. Configuration settings are organized into two types: system wide and PCS specific settings.

An AAPS can include a plurality of traffic control signals (traffic signals), wherein a traffic signal is any highway traffic signal by which traffic is alternately directed to stop and permitted to proceed. Traffic includes pedestrians, bicyclists, ridden or herded animals, vehicles, streetcars, and other conveyances either singularly or together while using any highway for purposes of travel. An AAPS can also include a plurality of Accessible Pedestrian Signals (APSs) that can communicate information about pedestrian timing in non-visual format such as audible tones, verbal messages, and/or vibrations. For low-vision individuals, these audible signals have the same safety and legal implications as illuminated traffic signals. Standard traffic signals can be included as well. An APS can provide three states of operation: Don't Walk (DW), Walk (W), and Flashing Don't Walk (FDW) and in a normal sequence of events when a pedestrian activates the pedestrian button is as follows. A traffic controller indicates the start of the pedestrian phase by illuminating the Walk signal. After a predetermined time based on the length of the cross walk and the assumed pedestrian walking speed, the pedestrian signal flashes the Don't Walk signal. The FDW interval terminates with a solid Don't Walk signal. For exclusive pedestrian movement operations, the time intervals of the W, FDW and DW intervals are fixed. For pedestrian movement schemes that allow parallel vehicle movement, the minimum vehicle green time must be no less than the maximum time of the W plus FDW intervals. Pedestrian signal errors can be signaled with an LED or array of LEDs at the pedestrian signal while more complete error information is available via the browser-based interface.

An AAPS system can use tones of a particular frequency and interval, as well as speech messages. Locator tones are provided to aid pedestrians in finding a button, and beaconing can be used to assist low-vision pedestrians to a destination. The AAPS system can communicate pedestrian signal and pedestrian button status from electronics that can be physically located in the pedestrian signal. Power can be obtained from power cables used to power pedestrian displays, and these cables can be configured to conduct data signals using EoP. In conventional systems, once signal control lines leave a traffic controller cabinet, there is no feedback from the pedestrian signal other than the amount of load current. If a microprocessor malfunctions and plays an incorrect audible message that indicates a walk signal is on when it is not, then there is a safety hazard. Such conventional systems can be referred to as "unsupervised." In addition, pedestrian buttons can fail by being permanently open circuited or permanently short circuited. Such a failure is only detectable by public complaint or intersection inspection by maintenance personnel.

In AAPS systems, different audio messages can be played depending upon pedestrian signal status and the operation of pedestrian buttons. Bidirectional communications (via Ethernet in the examples) permits information exchange relating to operating controls and possible failure modes. Each pedestrian button is uniquely distinguishable based on a stored identifier so that beaconing on only one side of an intersection can be used, and audio messages can be stored at the pedestrian button location, or stored elsewhere.

The AAPS provides for routing data messaging among system components. Pedestrian signal status for each pedestrian signal can be distributed throughout the AAPS, and messages acknowledged. Any PCS that does not respond can be investigated for possible failures, and the AAPS can modify traffic control settings so that a safe condition is maintained. Pedestrian signals can include a traffic signal identifier in messages along with an indication of what (if any) audio message or tone is currently being played or has most recently been played.

Audio files are transferred to the PMU using HTML multipart/form-data. In this form, the sound file and other fields of the form are packaged and sent to the PMU web host and processed by a common gateway interface (CGI) script. There are five fields sent to the PMU web host: stationid, fileid, resid, the sound file, and the submit field. The stationid field is what PCS has been selected by a user to receive the audio file. Fileid is a number identifying which file is being sent. Resid is a text string used by the AAPMS webpage to notify the user of the status of each file transfer. The submit field is the value of the value of the Submit button that was pressed.

SNMP messages enable the PMU to validate communications with each PCS and each PCS is capable of verifying that a call has been placed to the PMU. For normal operation the PMU periodically generates a SetRequest message that updates each system PCS that in turn returns a GetResponse message to the PMU to verify to the PMU that each PCS is operational and has received the correct information. When a user has pressed a pedestrian button, the PCS sends a Trap message to the PMU. A Trap is an unsolicited message generated by the PCS that the PMU need not respond to. The Trap is verified received on the next received SetRequest. If the next SetResponse message from the PMU does not indicate that a call has been placed, the PCS will generate another Trap.

With the bidirectional communication functionality as described above, traffic control systems can exchange and verify messages of various kinds Messages can be associated with audio message selection and volume, identification of beacon destinations, and detection of unsafe conditions. The description herein provides representative examples, but it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. A pedestrian call station, comprising:

a pedestrian call switch operable by a pedestrian; and a pedestrian station processor coupled to the pedestrian call switch and configured to communicate a traffic control request to a pedestrian management unit in response to activation of the pedestrian call switch by the pedestrian and to receive an acknowledgment of the traffic control request from the pedestrian management unit, wherein the traffic control request is associated with controlling at least one traffic signal so as to allow or deny movement of vehicular traffic.

2. The pedestrian call station of claim 1, further comprising a network interface configured to communicate with the pedestrian station processor, wherein the network interface is coupled to receive the acknowledgment of the traffic control request from the pedestrian management unit and communicate the traffic control request from the pedestrian station processor to a traffic controller associated with controlling the at least one traffic signal.

3. The pedestrian call station of claim 1, further comprising a memory, wherein the pedestrian station processor is configured to retrieve at least one audio message from the memory and communicate an identifier associated with the retrieved audio message to the pedestrian management unit.

4. The pedestrian call station of claim 3, wherein the pedestrian station processor is configured to communicate an identifier associated with an audio message volume to the pedestrian management unit.

5. The pedestrian call station of claim 1, wherein the pedestrian station processor is configured to store an audio message received in a memory.

6. The pedestrian call station of claim 1, wherein the pedestrian station processor is operable to adjust an audio message volume based on a time of day.

7. The pedestrian call station of claim 1, further comprising a memory coupled to the pedestrian station processor and operable to store audio messages associated with WALK, WAIT, DON'T WALK, and a beacon destination.

8. The pedestrian call station of claim 7, wherein the pedestrian station processor is operable to set an audio message volume.

9. A pedestrian service request system, comprising:

a pedestrian management processor; and a network interface coupled to the pedestrian management processor, wherein the network interface is operable to receive a request for a traffic control service from at least one pedestrian call station of a plurality of pedestrian call stations and to transmit a traffic control request acknowledgment to the at least one pedestrian call station of the plurality of pedestrian call stations, wherein the at least one pedestrian call station of the plurality of pedestrian call stations includes a network interface operable to transmit a signal identifier to the pedestrian management processor.

10. The system of claim 9, wherein the pedestrian management processor is operable to determine a traffic control status associated with at least one traffic control device.

11. The system of claim 9, wherein the network interface is operable to communicate traffic control system parameters to the pedestrian management processor.

12. The system of claim 11, wherein the network interface is operable to communicate audio message parameters to the pedestrian management processor.

13. The system of claim 9, wherein the network interface is operable to receive a digital audio message, and the pedestrian management processor includes a memory configured to store the digital audio message.

14. The system of claim 13, wherein the network interface is operable to transmit an audio message identifier to the pedestrian management processor.

15. The system of claim 9, wherein the pedestrian management processor is operable to send a communication to a second pedestrian call station via the network interface in response to the request for traffic control service, the communication including an instruction to play an audible beacon message.

* * * * *